(12) United States Patent
Gregory

(10) Patent No.: US 10,190,568 B2
(45) Date of Patent: Jan. 29, 2019

(54) WAVE ENERGY CONVERTER

(71) Applicant: Bruce Gregory, London (GB)

(72) Inventor: Bruce Gregory, London (GB)

(*) Notice: Subject to any disclaimer, the term of this patent is extended or adjusted under 35 U.S.C. 154(b) by 34 days.

(21) Appl. No.: 15/501,057

(22) PCT Filed: Aug. 10, 2015

(86) PCT No.: PCT/EP2015/068401
§ 371 (c)(1),
(2) Date: Feb. 1, 2017

(87) PCT Pub. No.: WO2016/023874
PCT Pub. Date: Feb. 18, 2016

(65) Prior Publication Data
US 2017/0226984 A1    Aug. 10, 2017

(30) Foreign Application Priority Data
Aug. 13, 2014  (GB) .................................. 1414379.6

(51) Int. Cl.
*F03B 13/18* (2006.01)
*F03B 15/02* (2006.01)

(52) U.S. Cl.
CPC .......... *F03B 13/1895* (2013.01); *F03B 15/02* (2013.01); *F05B 2240/97* (2013.01); *F05B 2270/18* (2013.01)

(58) Field of Classification Search
CPC .. F03B 13/16; F03B 13/1885; F03B 13/1895; F03B 13/20; Y02E 10/38
See application file for complete search history.

(56) References Cited

U.S. PATENT DOCUMENTS

| | | | |
|---|---|---|---|
| 2,791,979 | A | 5/1957 | Willis |
| 3,766,307 | A | 10/1973 | Andrews |
| 4,208,877 | A | 6/1980 | Evans et al. |
| 4,453,894 | A | 6/1984 | Ferone et al. |
| 6,229,225 | B1 | 5/2001 | Carroll |
| 6,756,695 | B2 | 6/2004 | Hibbs et al. |
| 7,245,041 | B1 | 7/2007 | Olsen |
| 7,319,278 | B2 | 1/2008 | Gehring |
| 7,632,041 | B2 | 12/2009 | Jean et al. |
| 8,093,736 | B2 | 1/2012 | Raftery |
| 8,480,381 | B2 | 7/2013 | Burns |

(Continued)

FOREIGN PATENT DOCUMENTS

| | | |
|---|---|---|
| EP | 2776707 A2 | 9/2014 |
| WO | WO 02/059480 A1 | 8/2002 |

(Continued)

*Primary Examiner* — Jonathan Matthias

(57) ABSTRACT

A wave energy converter comprises a submerged buoyant vessel (10) that can react directly with the seabed using neutrally buoyant taut tethers (19) at depths that characterize the continental shelf. The vessel (10) is held by a taut vertical mooring line (12) of controllable length and a taut vertical upper line (17) of controllable length connected to a surface float (15). These lines (12, 17) have elastic sections, allowing the vessel (10) to follow an orbital path in response to swell from any direction. By varying the length of these lines (12, 17) the submersion of the vessel (10) can be varied dynamically according to wave height. By varying the tension of these lines (12, 17) the natural oscillation period of the vessel (10) can be varied dynamically in response to the swell period.

8 Claims, 11 Drawing Sheets

(56) References Cited

U.S. PATENT DOCUMENTS

| | | |
|---|---|---|
| 2009/0056327 A1 | 3/2009 | Raikomo et al. |
| 2011/0012358 A1 | 1/2011 | Brewster et al. |
| 2011/0146263 A9 | 6/2011 | Moore |
| 2011/0155039 A1 | 6/2011 | Moore |
| 2012/0102938 A1 | 5/2012 | Burns |
| 2013/0160444 A1 | 6/2013 | Foster et al. |
| 2014/0117671 A1 | 5/2014 | Gregory |

FOREIGN PATENT DOCUMENTS

| | | |
|---|---|---|
| WO | WO 2008065684 A1 | 6/2008 |
| WO | WO 2009/012575 A1 | 1/2009 |
| WO | WO 2010007418 A3 | 12/2010 |
| WO | WO 2015/003229 A1 | 1/2015 |

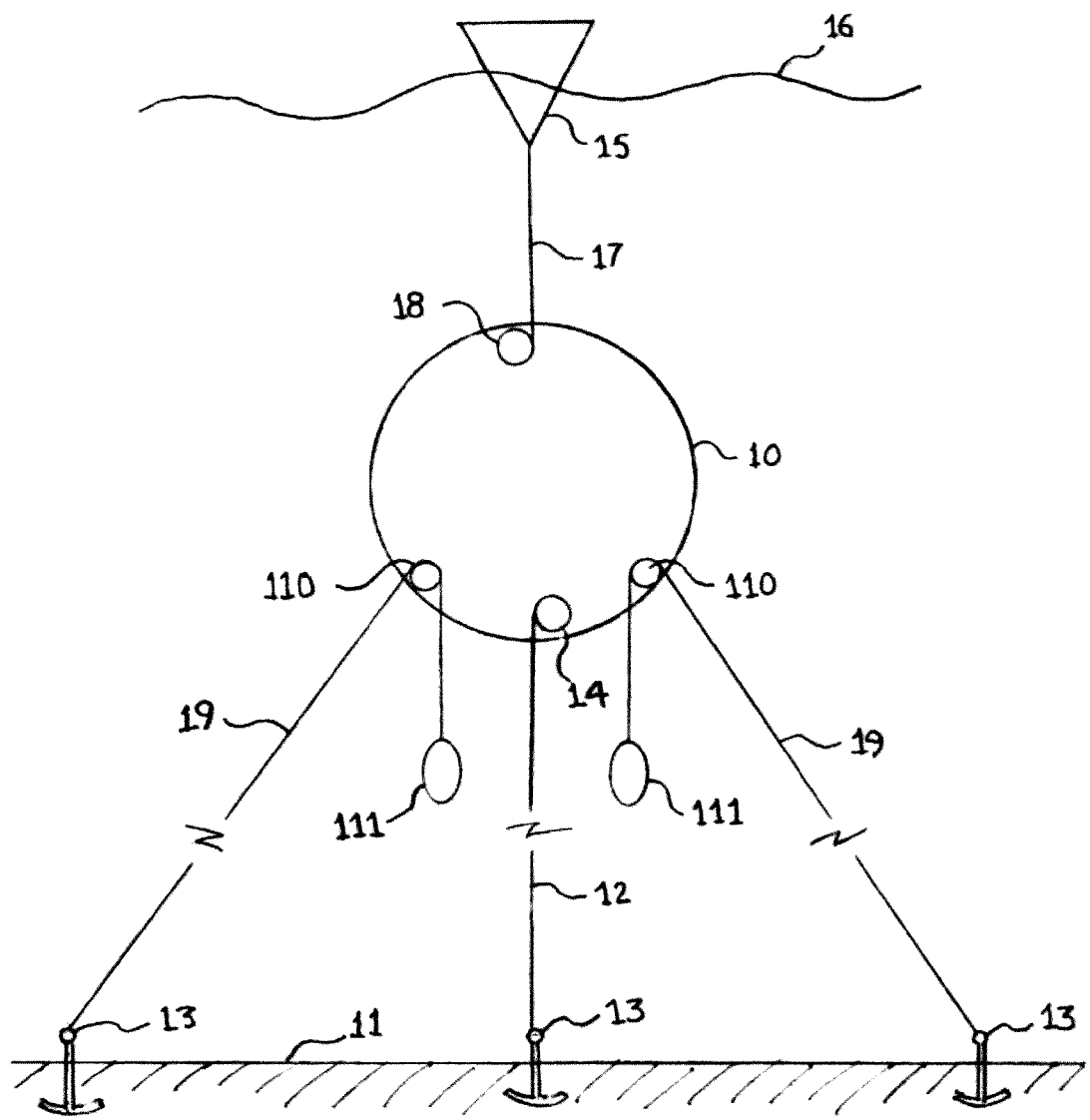

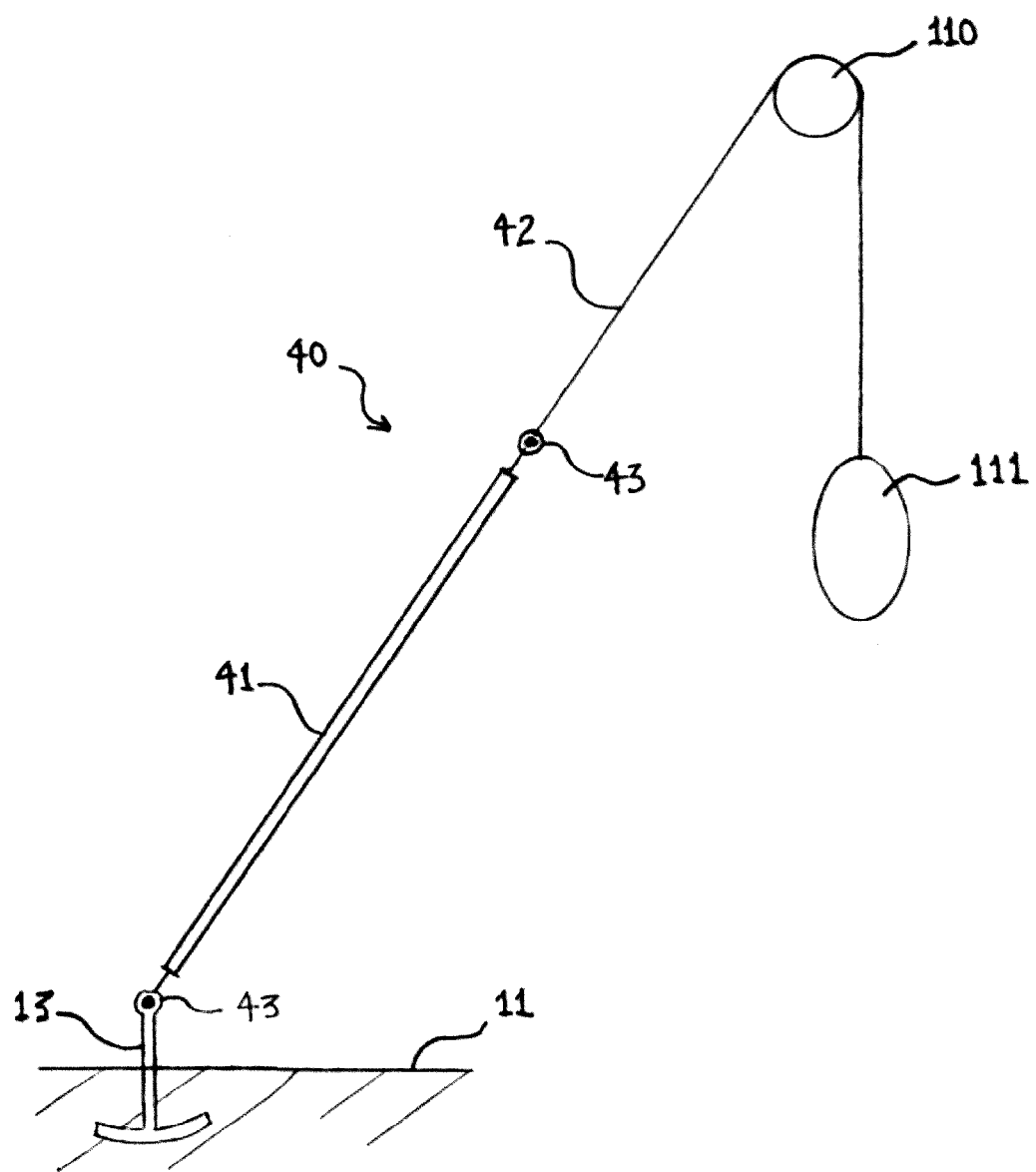

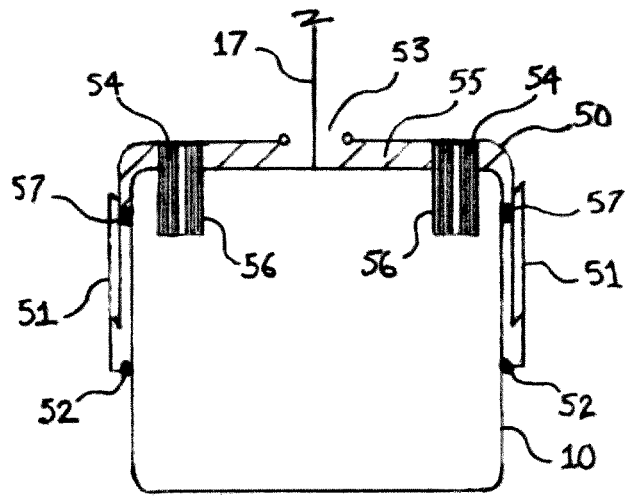
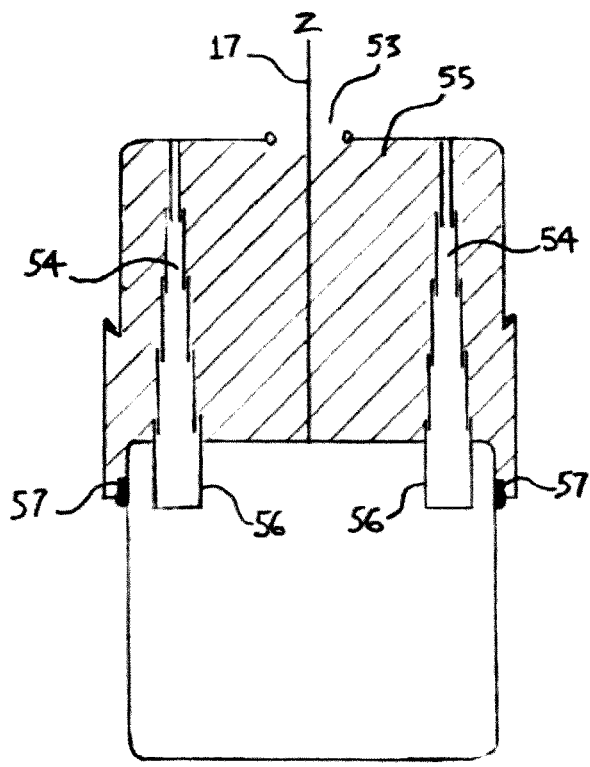

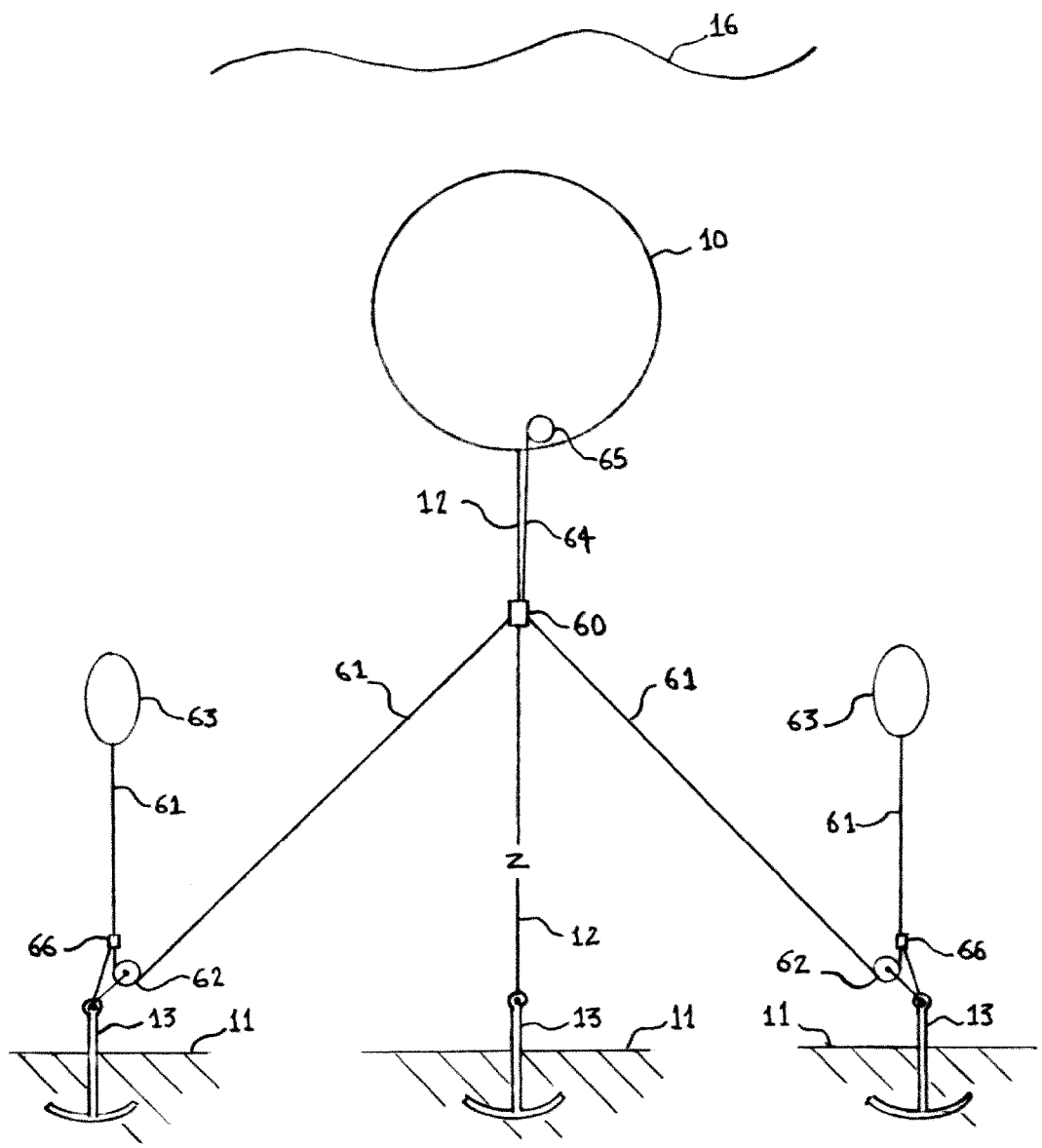

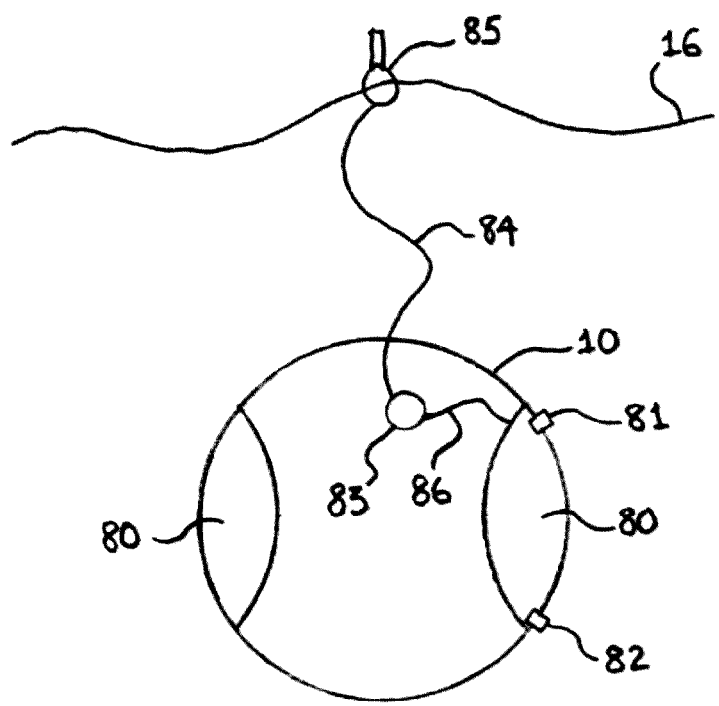

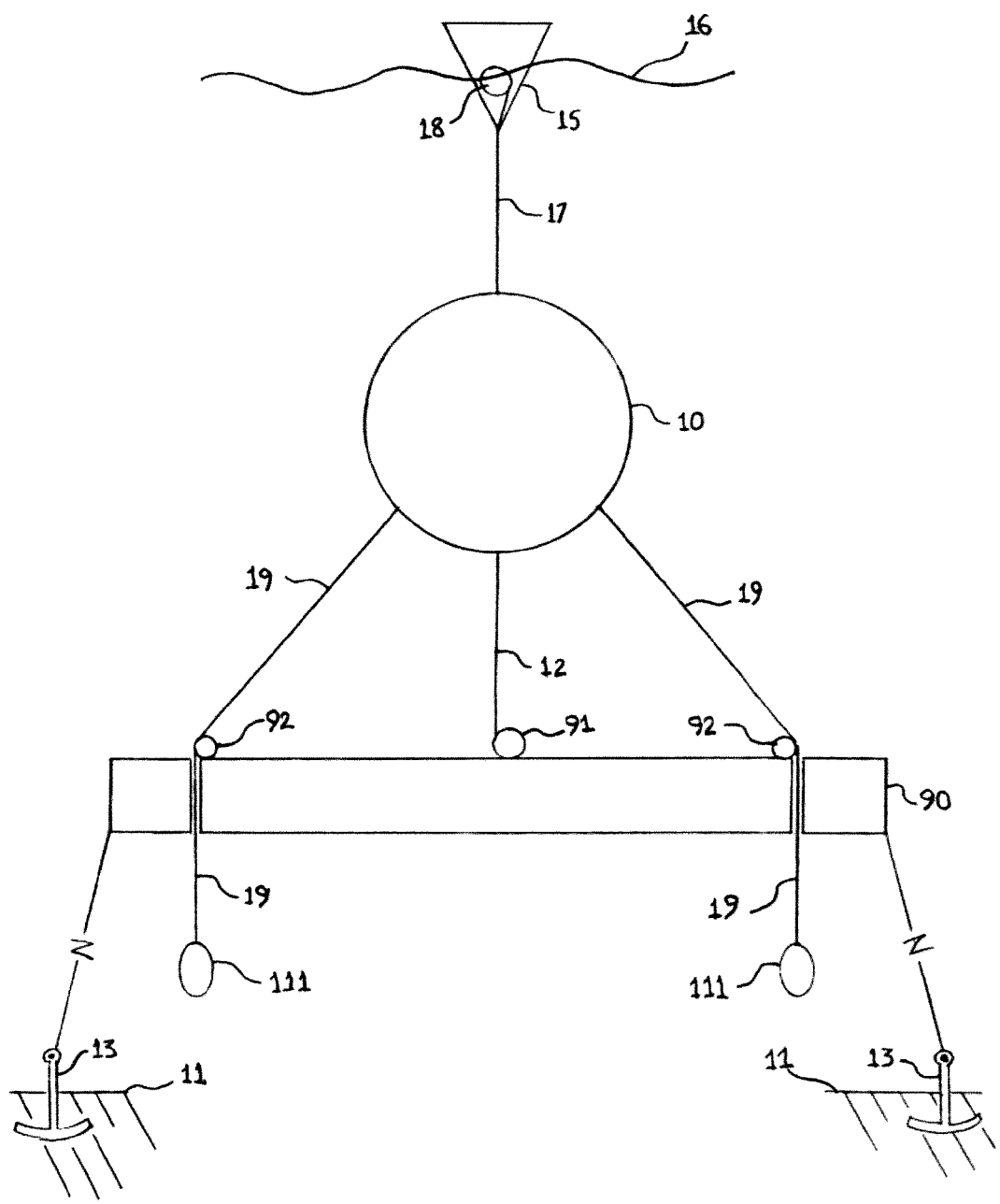

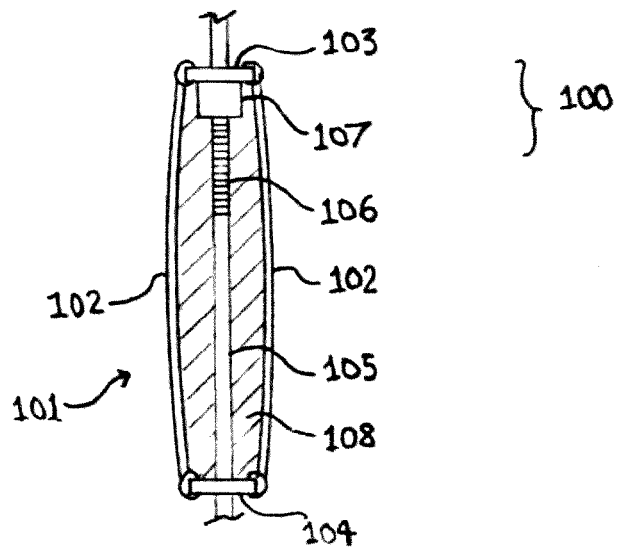
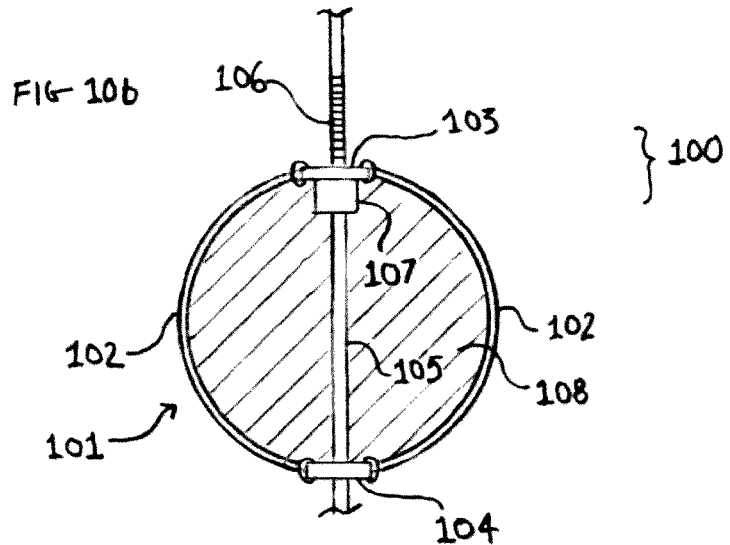
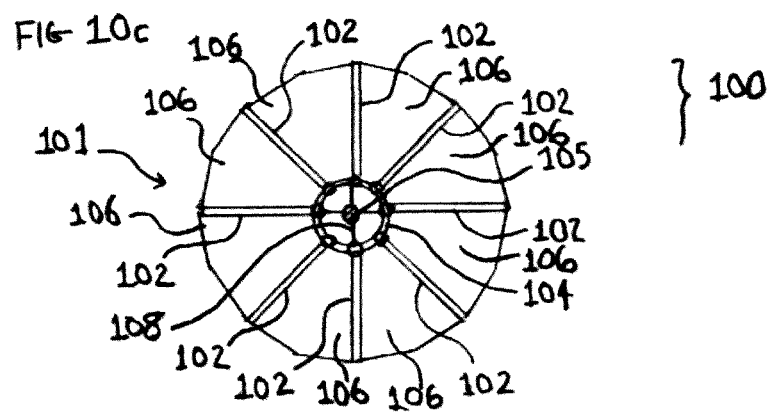

WAVE ENERGY CONVERTER

FIELD OF INVENTION

Conversion of oceanic wave energy to useful power.

BACKGROUND

Problem

In the last 200 years, it is estimated that more than 1500 wave energy converter (WEC) patents have been filed world-wide and in the last 50 years, more than 200 WEC companies have been formed. Despite this effort, no WEC has yet succeeded in generating electricity on a commercial scale at a price competitive with conventional sources.

This failure derives from the problem of achieving efficient reaction in deep water, the innate difficulty of capturing the complete motion of waves, the hostility of the marine environment and the extreme variability of wave pattern and sea-state.

Note: in this description, the word wave is used as a generic term for undulations in water; the word swell refers to ocean waves driven by remote storms.

AIMS

The purpose of the present invention is to capture and convert wave energy efficiently, reliably and at affordable life-cycle cost, so achieving a Levelized Cost of Energy (LCOE) competitive with conventional sources of power. The specific aims of this invention are:

1. Deep-water operability. A useful WEC allows operation in locations with persistent, energetic swell and captures swell energy. Energetic swell is generated by major storms in the middle of large oceans and suitable wave climates exist several km offshore on the edges of large oceans at 30-60 degrees of latitude: for example, off the west coasts of Scotland, Ireland, the USA and Australia. Some WEC designs are limited to shallow, near-shore locations. Near-shore swell direction is often predictable, allowing simpler design. Also such location allows lower costs of seabed works and shore connection. However, the commercial opportunity for such WECs is limited to sites where the environmental impact can be tolerated. Most of the useful opportunity for WECs lies over the continental shelf, which can be characterized as follows: it is typically flat, with a slope of less than one degree and covered mainly with soft sediment; on average it is 80 km wide and 60 m deep and seldom exceeds 150 m in depth. The seabed beyond the continental shelf typically falls rapidly to great depths. For example, the average depth of the Atlantic Ocean basin is around 4,000 m and the maximum depth is over 8,000 m. In a futuristic scenario, mid-ocean WECs could provide power to a floating factory or to a floating inhabited island. But near-term commercial demand for a WEC able to operate over such super-deep water is small. A report by the UK Carbon Trust (http://www.carbontrust.com/media/202649/ctc816-uk-wave-energy-resource.pdf) concludes that sites over the continental shelf are likely to provide the lowest LCOE. Therefore, deep-water operability means here being able to operate in depths that characterize the continental shelf. The terms swell and wave are used here interchangeably.

2. An efficient reaction body. Power can be extracted from waves only if wave action results in relative motion between two bodies. For example, in a majority of early WEC designs, dating to the late 1800 s, the first body was usually a moving float or paddle and the second or reaction body was a stationary structure attached to a pier. The only wholly efficient reaction body for a WEC is the seabed or a structure fixed completely rigidly to the seabed. Many WEC designs attempt to use reaction between two or more floating bodies, by arranging the bodies to be out of phase. But arranging for bodies to be consistently out of phase in a highly variable wave climate is impractical. Other designs use a reaction body that has very large mass and added mass that may also be placed sufficiently deep to avoid wave action. But all floating reaction bodies will radiate energy and the use of very large masses is costly. Other reaction bodies include gyroscopes and pendulums. These can be put in the interior of a sealed WEC, reducing vulnerability to the marine environment, but both these solutions are difficult to scale to megawatt levels of energy.

3. An omnidirectional device. Offshore swell direction is variable and swells may arrive simultaneously from different directions. A preferred WEC can capture swell energy arriving from any direction. As an alternative, a WEC can be arranged to align itself with the dominant swell.

4. Multi-vector energy capture. The most common design of a WEC is a heaving buoy. This has the advantage of being omnidirectional and therefore suited to off-shore use. But it can capture only the heaving vector of wave energy, and so is limited to no more than 50% efficiency. Another common design is a near-shore hinged flap. This captures surging energy and again is limited to a maximum of 50% efficiency. A WEC preferably captures energy from both the heave and surge vectors, and does so by responding to the orbital motion of water particles. For example, a vessel suitably arranged to pitch on the sea surface will follow an orbital path.

5. Dynamic tuning to wave height. A defining problem for a WEC is the extreme variability of wave energy. For example, the average annual significant wave height on the edge of the North Atlantic may be around 2 m, but, infrequently, the height may reach 20 m. Since wave energy varies with the square of wave height, this represents a variation in energy of 100×. An ideal WEC is sensitive to small waves and progressively uncoupled from larger waves, so avoiding the need for costly over-design and enabling the device to operate at a high capacity factor. Dynamic tuning to wave height allows a standard product to be used at high capacity factor in different locations in different wave states. Dynamic tuning means here real-time adjustment, within minutes, to a significant trend in wave height. The sea state can change rapidly when a storm swell arrives in a previously calm sea. In a stormy period in January 2014, wave heights off the coast of western Ireland changed from 3 m to a severe sea state of over 10 m in as little as three hours. Where the WEC depends on submersion to quiet water to avoid severe storms, the rate of depth adjustment is therefore preferably 6 m per hour or faster. (Quiet water is defined here as a depth preferably equal to half the wavelength of the most energetic swell and at least 20 m deep). A slower rate of adjustment is tolerable without danger to the WEC if extreme wave height conditions can be forecasted.

However, slower tuning means that the device will not be optimally coupled to wave energy. Sufficiently rapid tuning to wave height ensures that the high energy of storm swell is fully exploited by the WEC and, at the same time, the risks of storm swell are controlled.

6. Dynamic tuning to swell period. A second defining problem for a WEC is the wide variability in swell period. The range of periods that characterizes energetic swell varies by a factor of three. The relevant range of periods varies by location but typically, on the edge of a major ocean, is from 5 to 15 seconds. It is highly desirable to be able to tune the WEC to the swell period in order to achieve resonant transfer of energy, and also to be able to de-tune the WEC in severe sea states. In the case of a heaving WEC, the resonant period of the device varies with the square root of the total mass. So, tuning by mass alone, total mass must be varied by a factor of 9×. In the case of a wave-following WEC, tuning requires vessel length to be adapted to wavelength. But wavelength varies with the square of the period, so that, for example, wavelengths can vary from 40 m to 350 m. This variability makes tuning of a wave-following WEC especially difficult. A common strategy is to design the WEC to be resonant at the peak of the local energy spectrum and to rely on wide bandwidth. This will always be inferior to dynamic tuning. Dynamic tuning means here real-time adjustment, within minutes, to significant trends in swell period. For example, when a storm swell arrives in previously calm seas, the swell period can increase by 4-5 seconds in less than an hour. Therefore, a tuning rate of 10 minutes per second of period is desirable. This matter is further discussed later. Wide range tuning means here tuning across a three-fold range of swell periods. Additionally, it is desirable to have a tuning method that is not energy-intensive. For example, it can be shown that dynamically tuning a heaving, surface-piercing float of just a few meters diameter by moving water in and out of it can require many tons of water to be moved across a significant pressure difference in a few minutes. A dynamic tuning method that consumes less energy is preferable.

7. Easy to deploy. The cost of a WEC is significantly affected by ease of deployment. A WEC is preferably easily transported in sub-units to the dock-side, easily assembled, towed to its destination and installed. Seabed works requiring divers or remotely operated vehicles should be avoided; at depths over 50 m, divers must follow expensive protocols.

8. Easy to maintain. The cost of a WEC is significantly affected by ease of maintenance. Preferably, a WEC can be serviced in situ and at the surface, with easy swapping of modular components. Additionally, the WEC should be reliable, using where possible, standard and tested technology.

9. Low capital cost. Preferably, a WEC uses standard parts, non-exotic materials and simple geometries. A WEC benefits from using drive train technology that has been developed for the wind turbine industry. This technology converts slow rotational motion to grid electricity: the additional requirement is the means to convert reciprocating wave action to rotational motion. Intense global competition is constantly improving the performance, cost and reliability of the wind turbine drive train: it reduces cost and risk to exploit this progress.

10. Storm-proof. Extreme sea states, however rare, are a constant threat to a WEC. Common strategies for responding to this threat include over-design, decoupling and submersion. For example, a wave-following design, comprising a chain of floats hinged together and tethered from the front, will tend to decouple in severe seas and to 'punch through' high waves. However, high waves may also strike from the side, requiring overdesign of the hinges. As another example, in severe seas, a heaving float may be decoupled from wave action by being locked to its reaction body. In a further example, a float moving on an arm hinged to a platform can be raised out of the sea and locked in place. In a further example, a surging flap can be locked flat on the seabed. Progressive submersion of a surface float can be arranged by flooding. As the float moves under the water, the restoring force becomes small, the resonant period rises and the float becomes unresponsive to wave action. Given the infrequency of the most severe sea states, testing of the strategies described requires prolonged sea trials of full-scale prototypes.

11. Environmentally acceptable. Specific environmental requirements vary by location but in general, a WEC is preferably not visually intrusive and does not adversely affect wild life, fishing or navigation.

Design

The set of aims listed above represents a major design challenge: so much so that no prior art has so far satisfied all these requirements and consequently the LCOE of wave power remains stubbornly high at up to 10× the LCOE of conventional sources of power. The present invention is capable of meeting the aims listed above and in its preferred form has the following features:

1. A single unit of the WEC comprises a float—called here an actuator—that is arranged to be wholly submerged. The forces acting on this float are much reduced compared with a surface-piercing float and so, for the same power, such a float must be larger. However, this disadvantage is outweighed by the reduced strength requirements of the actuator, the potential ability to tune an actuator dynamically to wave height, the provable avoidance of storm risk and almost complete unobtrusiveness.

2. The actuator reacts directly against the seabed to ensure efficient reaction. Energy loss due to elastic axial extension and flexing of seabed tethers up to depths that characterise the continental shelf is reduced to acceptable levels by using low-stretch tethers arranged to have neutral buoyancy. These tethers are arranged to be held taut at steady tension.

3. The actuator employs axi-symmetric tethers to capture heave and surge forces omnidirectionally.

4. The submersion of the actuator is dynamically variable.

5. The factors affecting the natural oscillation period of the actuator—moment of inertia and restoring force—are dynamically variable.

6. Installation does not require significant seabed works.

7. The significant working parts of the WEC are contained inside the actuator and the actuator can be easily accessed on the sea surface for inspection and replacement of modular units.

PRIOR ART

Gregory (GB1218866.0) describes an omnidirectional WEC that employs axi-symmetric tethers and that uses a locking winch to control depth of immersion. However, this is a surface-piercing float that captures surging energy and crucially lacks an elastic element that would also allow it to capture heaving energy. The purpose of the locking winch is to control the surging oscillation period by means of variation in water-plane area. The device cannot be tuned to wave height, although it can avoid extreme sea states by flooding.

Carnegie Wave Energy of Australia (www.carnegiewave.com) has developed a WEC called CETO based on an actuator. The first five prototypes assumed shallow water (typically less than 50 m) and a near-shore location (preferably under 200 m from the shore). A spheroidal actuator is connected by a rigid vertical rod to a pump on the seabed: this pumps water to an on-shore turbine or to a reverse osmosis water purification plant. The actuator is held a few meters below the sea surface. It operates in the heaving vector and uses open ports in the actuator to damp surging motion. This dissipates energy and makes the heave and surge resonances different. The plan for the sixth prototype is to enable operation in deeper water by fixing the pump to the actuator. The CETO WEC is omnidirectional but cannot be used in water up to 150 m deep, is not multi-vector and is not dynamically tunable either to wave height or period. Installation and maintenance require seabed works.

The primary CETO patent is U.S. Pat. No. 8,480,381 Burns.

In US 2012/0102938, Burns also describes a spheroidal submerged float that extracts wave energy by means of a plurality of pumps reacting against a platform on the seabed and operating in both heave and surge vectors. The float is intended to be close to the sea surface and the water depth is intended to be around 10 m. The float features an arrangement of controllable flaps that can change the coupling of the float to the sea and so protect the device in storm conditions.

The deficiencies of the described device include non-operability in deep water and lack of dynamic tuning to wave height or to wave period.

40South Energy of the UK (www.40southenergy.com) has been developing a WEC based on an actuator. The WEC is omnidirectional and multi-vector. Four axi-symmetric tethers connect the actuator to a submerged, floating platform that is moored by non-vertical taut mooring lines to the seabed. In normal operation, the actuator is around 2 m below the sea surface, the submerged platform is around 22 m deep and the seabed is 45-50 m deep. The actuator is tunable to wave height by varying the length of the tethers and so varying the level of immersion of the actuator. Power is taken off from the movement of the tethers inside the actuator. The submerged level of the platform can be varied by changing the length of the mooring lines. The actuator and platform can be raised to the surface for maintenance. The operation of the device is explained in an online video (https://www.youtube.com/watch?v=-Eue99Ci7KQ)

The effectiveness of this platform as a reaction body depends on its geometry, on its depth of submersion, on its total mass, including added mass, and on the rigidity of the mooring lines.

To ensure that the platform does not tend to move in phase with the actuator, it needs to span at least two wave lengths: at 5 to 15 seconds wave period, these distances are 80 m and 700 m respectively. Since the highest energy swell tends to be at the longest wavelengths, a platform that assumes omnidirectional operation and that depends on plan area for stability should be 700 m in diameter. Where the platform has a smaller plan area, it will tend to move in phase with the actuator, with consequent loss of power. Such a large plan area is not impossible but would require assembly at sea and would be affordable only when supporting a large array of actuators.

Alternatively, the platform must be kept in quiet water during operation of the device, by quiet water meaning water at the depth at which wave action becomes very small. The wave energy at a depth equal to half a wavelength is less than 1% of the wave energy at the surface.

Since the range of wavelengths that characterize energetic ocean swells is typically 40 to 350 m, the required quiet water depth is between 20 and 175 m. Because the highest energy swell tends to be at the longest wavelengths, the latter depth will be more effective. The latter depth is significantly greater than the average depth of the continental shelf (60 m) and greater than the expected maximum depth (150 m) so that, over the continental shelf (which is most likely to yield low LCOE), the platform must be above the quiet water zone and again will tend to move in phase with the actuator.

The platform should also have sufficiently large total mass to resist motion and to avoid any natural period of oscillation that coincides with a wave period. Large mass can be achieved at least cost by using cheap materials, such as concrete, by enclosing large volumes of water and by selecting a geometry that maximizes added mass in all directions. An exemplary design is a very large cuboid concrete water tank with exterior baffles.

Lastly, the platform can be made to resist motion by means of rigid members connecting the platform to the seabed. The model for this solution is the well-known Tension Leg Platform (TLP) in which a positively buoyant platform pulls on vertical tethers that are anchored to the seabed. To resist the omnidirectional motion of the float, the tethers must be angled. If the tethers are perfectly rigid, then the platform will behave like the seabed itself and become an efficient reaction body. The rigidity of the tethers cannot be perfect and depends on the construction of the tethers, the length of mooring, the mooring angle and the level of tension.

In summary, a floating reaction body will be tolerably efficient if it combines some or all of the following features:
It has a sufficiently large plan area.
It is at sufficient depth.
It has a sufficiently large total mass.
It is connected with sufficient rigidity to the seabed.

None of the above conditions are specified for the 40South platform. In general, the platform described, if built at reasonable cost and used over the continental shelf will be a reaction body of significant inefficiency.

The device described is not dynamically tunable to wave period.

The latest device, the R115, with a nominal capacity of 150 kW, began marine tests with an Italian utility in 2012. It is not described in a published patent but derives from the following patent filing:

WO 2008065684 Grassi (40South) 2008, filed 2006

A WEC is arranged to be responsive to multiple vectors, to be omnidirectional, to be adjustable to wave height, to be proof against storms, to be usable in any depth of water and to be simple to install and maintain. The configuration is an upper member linked to a lower member by multiple cables. The lower member is arranged to be effectively stationary. Submersion of the upper member is dynamically controlled. It is claimed that, provided the upper member is small compared with wavelength, then it is non-oscillatory and does not need to be tuned.

MPS of the UK (www.marinepowersystems.co.uk) also describe an actuator-based WEC that is omnidirectional and multi-vector. Four axi-symmetric tethers connect the actuator to a massive submerged, floating platform.

The MPS patent filings are:

WO 2010007418 2010; GB 2461792, filed July 2009. A surface float that is a point absorber is connected to a submersible reaction body. The reaction body has at least two states: submerged with the system operable and floating, in a configuration that assists deployment and maintenance.

US 2013/0160444 2013, priority 2010. A submersible reaction body with controllable buoyancy and mass enables simplified deployment and maintenance of a WEC. The body can have folding flaps that increase drag and added mass.

WO 2013/068748 2013, priority 2011. The WEC comprises an actuator attached to a submersible platform by axi-symmetric cables that are arranged to (a) enable orbital and omnidirectional motion, (b) capture and convert the motion of the actuator (c) adjust the height of the actuator. The actuator mass and buoyancy can be adjusted. The platform can be set to different depths by arranging the platform to have negative buoyancy and connecting the platform by winched lines to an array of surface floats. Alternatively the platform has positive buoyancy and is connected by winched lines to the seabed. Each cable runs over a pulley mounted on the platform and terminates in an 'energy converter,' which can be a hydraulic motor. Each pulley is mounted so that it can be moved along the platform, so changing the length of the cable between pulley and actuator. The length of the rack must be sufficient to allow movement of the actuator between the surface and the maximum operating depth of the platform and the horizontal radius of the platform must exceed this length.

A weakness of such a large flat platform is that it will tend to accumulate marine deposits and to become biologically fouled. The working parts on the upper surface of the platform could require frequent cleaning or anti-fouling treatment, for example, special surface finishes, both at additional cost.

In general, such a submerged platform will be subject to ocean currents and must be anchored to keep station, for example by catenary mooring lines (FIG. 3 of the MPS filing). The cost of a floating platform is therefore not significantly offset by savings in seabed moorings.

A key weakness is that the platform, being close to neutrally buoyant, will tend to move orbitally in phase with the actuator. At the depths that characterize the continental shelf, the energy of long period swell will penetrate to the seabed so that the platform will tend to move in phase at any available level of submersion. If the platform is far away from the actuator, then there will be significant difference in the amplitudes of orbital motion, with the largest difference being when the actuator is near the sea surface and the platform is at its maximum depth. But when the platform is raised close to the actuator, the in-phase motion of the platform may significantly reduce its efficiency as a reaction body.

This effect can be eliminated only by constructing a massive platform with length and breadth exceeding two wavelengths ie in the range 80 to 700 m. Prior art has identified that given a sufficiently large platform multiple actuators connected to it could exert a net zero force on the platform, so that the platform will not move. This could be taken as a statement of the obvious: that a sufficiently large submerged platform will, in effect, simulate the seabed. The problem is one of cost. The present invention describes how, for sea depths that characterize the continental shelf, no such platform is required.

The MPS device tunes to wave height by adjusting the level of submersion of the actuator. When the platform is in quiet water, this adjustment is straightforward and rapid: the pulleys are moved along the rack. However, when the platform has been raised to near the surface (FIG. 7 of the MPS filing), then motion of the actuator downwards is limited by the very low speed of submersion of the platform. As defined here, dynamic tuning to wave height requires the actuator to adjust its depth at a rate of at least 6 m per hour. But it is unlikely that a very large and massive platform can be moved controllably at this rate.

The depth of submersion of the MPS platform is controlled by one of two methods: either the platform is negatively buoyant and suspended by winched lines from spar floats or it is positively buoyant and restrained by winched lines that are anchored to the seabed. In the first case, the platform and actuator positions do not need to be adjusted for tidal variation in depth. In the second case, the positions relative to the seabed need to be adjusted. Tidal variation over the continental shelf can be in the range 0.5 to 11 m. In the extreme case, the required rate of adjustment to depth can be around 1 m per hour. This can be additional to the rate of adjustment required to tune to wave height.

The MPS filing describes two methods of tuning to wave period. In the first method, water in the actuator is blown out by compressed air. This reduces the mass of the actuator and increases the net buoyancy. This is an energetic process, the energy required increasing with the depth of submersion of the actuator. For example, the volume of a similar existing actuator, the R115 of 40South has a capacity of 150 kW and an actuator volume of 112 cubic meters. To change the natural oscillation period of this actuator by one second, from say 7 seconds period to 6 seconds using variation in mass alone requires the total mass to be reduced by 27%, equivalent to around 30 tonnes of water. The desirable rate of tuning is 10 minutes per second, so that the pumping rate is 180 tonnes per hour. Pumping at this rate against the pressure difference prevailing at, for example, 10 m depth, and ignoring the substantial friction losses, the power required is 4.9 kW. An air compressor will convert around 80% of input energy to heat, so that the total energy consumed will be 5× this amount, or over 16% of the power generating capacity of the actuator. This calculation neglects the tuning effect of the change in net buoyancy. But the relative change depends on the starting value, which will be significant. A method that consumes less energy is desirable.

In the second method, the length of the tethers between the actuator and the platform is varied so that the radius of motion of the actuator is varied. In FIG. 12 of the MPS filing, the variation in power capture with the distance between actuator and platform is given as a function of wave period. Assuming that the actuator is behaving like an inverted pendulum, we can expect the period of peak power capture to vary with the square root of this distance. At 25 m distance, the peak period is given as 6.75 seconds. The expected periods for 37.5 m and 50 m are therefore 8.3 and 9.5 seconds respectively: these figures agree with the results given. To achieve the 9.5 seconds peak period requires the water depth to exceed 50 m and therefore the horizontal radius of the platform must also exceed 50 m. To achieve a peak period at, say, 13 seconds requires a distance between actuator and platform to be around 90 m, requiring the horizontal radius of the platform to exceed this length. It is obvious that tuning the actuator to long periods using this method requires a very large platform. Additionally, this method rules out tuning to periods exceeding around 12 seconds in sea depths under 100 m: this is significantly deeper than the average depth of the continental shelf (60 m).

A shift in resonant oscillation period from 6.75 seconds to 9.5 seconds corresponds to a shift in tether length from 25 m to 50 m. This requires the platform to descend by up to 25 m to allow sufficient depth to accommodate the tether length. However, controllable descent of the massive platform over 25 m is unlikely to be faster than 4 hours, implying a tuning speed of 90 minutes per second or 9x slower than dynamic tuning as defined here.

A further problem lies in the effectiveness of tuning by varying the length of tethers. Logically, such tuning is effective only in the surge vector.

Lastly, the long tethers required for long period tuning will, without special conditions, result in significant power losses through stretching and flexing.

The present invention describes alternative methods of tuning an actuator to wave period that are dynamic, allow tuning across the range of periods that characterise energetic ocean swell and require less energy.

In summary, the present invention avoids the cost of a floating platform as described by MPS or implemented by 40South Energy at the depths that characterise the continental shelf, avoids the inefficiency of a floating reaction body and also discloses superior methods of dynamic tuning to wave height and to wave period.

The following additional prior art is relevant, describing submerged floats. None of this prior art satisfies all the aims of the present invention.

US 2011/0146263 Moore 2011, priority 2008. A float is tethered tri-axially so that it moves with multiple degrees of freedom. The tethers act on counterweights inside the float. The surface of the float is corrugated: it is claimed that this improves performance.

U.S. Pat. No. 4,208,877 Evans et al 1980. A submerged buoyant cylinder is held aligned with the wave-front by four (sprung) tethers connected to seabed vane motors. The PTO can be at the cylinder. The cylinder moves orbitally. The cylinder is about 3 m below the surface and, in an example, is 15 m diameter and 30-45 m long. The cylinder can be lowered in severe seas by sensing tension in a tether and adjusting buoyancy.

U.S. Pat. No. 6,229,225 Carroll (OPT) 2001. A submerged buoyant float captures heave and surge forces using a single tether. The float can have variable geometry, mass and buoyancy. The reaction body is the seabed in shallow water; in deep water the reaction body is a submerged platform tethered to the seabed and arranged at a depth sufficient to avoid significant wave action.

U.S. Pat. No. 6,756,695 Hibbs et al 2004, filed 2001. A submerged buoyant float is restrained by a single tether and moves with surge forces. The PTO is a turbine suspended below the float. Variants are shown for shallow and deep water. In the former case, a tether is anchored to the seabed at each end and the float moves along the tether on rollers. Or the float moves along a rigid arched track. The surging period of the float can be tuned. The float can also be moved up and down. A large mass with drag fins enables deep-sea operation.

U.S. Pat. No. 7,632,041 Jean et al 2009, Filed 2007

Power is generated using elastic material. In a preferred instance the float is submerged, buoyant and cylindrical and has plural tethers fixed to the seabed. (FIGS. 4 and 5). The float follows an orbital path. Using a sensor, the level of submersion can be adjusted (FIG. 11). Variable immersion allows storms to be avoided and enables maintenance. Although not mentioned, the design can be omnidirectional.

US2009/0056327 Raikomo et al 2009, Priority 2005

Power is generated using a rigid submerged cylindrical float in orbital motion. This motion is enabled by a pair of hinged arms attached at each end of the cylinder with each arm connecting to shafts that take off power (FIGS. 3,4). The entire assembly can be rotated to allow alignment with the dominant swell. In an alternative arrangement power is taken off using a single rack and pinion (FIG. 5). In another instance, orbital motion is enabled by a single arm that drives a combination of vertical and horizontal rack and pinion (FIG. 6). Spring-loaded pulleys can replace the hinged arms and/or can provide a PTO (FIGS. 14, 15). A number of such devices can be supported on a submerged frame (FIG. 8). The immersed depth can be varied by adjusting mass or buoyancy, for example to avoid storms. The float can be spherical or ellipsoid.

US20110012358 Brewster at al 2011, Filed 2009

A partly submerged float reacts in both heave and surge vectors against a submerged reaction mass (ie platform). The float is axisymmetric to provide omnidirectional response. It is connected to the platform by plural linkages. The linkages have biasing and damping. By varying the length of linkages, the depth of the reaction mass can be changed to avoid the influence of storm waves. The platform can be made of concrete in a (cellular) structure that can be selectively filled with air, water, sand and so on.

A body of prior art deals with submerged and floating platforms to enable oil drilling in deep water and, more recently, to enable wind turbines, tidal turbines and WECs in deep water. Examples of WECs using submerged platforms include:

U.S. Pat. No. 4,453,894 Ferone et al 1984. A submerged floating platform arranged to be effectively stationary is connected to a surface float in a manner that enables and captures omnidirectional motion in both heave and surge vectors. In an example, the platform is 50×10 m and immersed to 5 to 20 m below the float. Motion is captured by hydraulic pistons. Turbine, generator and so on are mounted on the platform. The platform height and angle is controlled by variable ballast. The system is suited to in situ installation of parts.

U.S. Pat. No. 6,647,716 Boyd 2003. A number of floats/rams react against a largely submerged, floating body that has variable buoyancy and mass.

U.S. Pat. No. 7,245,041 Olson 2007. A long submerged and anchored beam (cylinder, truss or similar) or combination of beams supports multiple floats by rigid rods. The distributed action of the floats averages a net force of zero on the beam.

U.S. Pat. No. 7,319,278 Gehring 2008, filed 2005. A submerged anchored frame carries one or more spooling PTO devices, each connected to floats.

U.S. Pat. No. 8,093,736 Raftery 2012, filed 2009. A submerged floating platform carries a spooling PTO system attached to a float. The platform carries winches that control the level of submersion.

US 2011/0155039 Moore 2011, filed 2009. A WEC deployment system designed to enable easy deployment to deep water. A float is transported on a vessel that can be submerged by releasing gas from a buoyancy chamber. The float is connected to the vessel by multiple axi-symmetric cables.

A body of prior art describes low-stretch marine ropes and neutrally buoyant marine cables. Relevant patents include:

U.S. Pat. No. 3,957,112 Knibbe at al 1976, filed 1974. A marine riser is made buoyant by winding stiff-walled, fluid-tight tube around the riser.

U.S. Pat. No. 3,766,307 Andrews 1973, filed 1972. An underwater cable is made buoyant by encasing a series of discrete buoyant sections inside the cable. For example, a flexible strip containing syntactic foam—hollow glass microspheres embedded in resin—is wound round the core of the cable and then covered by an outer sheath. The foam resists water pressure so that buoyancy is not affected by depth.

Such prior art is mainly concerned with advantages in deployment, for example, of electrical cables undersea. Prior art describing the use of neutrally buoyant tethers for efficient power extraction in a WEC has not been found.

SUMMARY OF INVENTION

1. An actuator is moored by a taut vertical mooring line to the seabed. The first mooring line has an elastically extensible section that allows the actuator to follow the orbital motion of sea swell. A lower locking winch is fixed to the end of the mooring line.
2. The same actuator is connected by a taut vertical upper line to a surface-piercing float of preferably conical shape. The upper line has an elastically extensible section that allows the actuator to follow the orbital motion of sea swell. An upper locking winch is fixed at the end of the upper line. Simultaneous operation of the lower and upper winches allows the actuator to be rapidly positioned at any desired depth and also allows the tensions on the first and second lines to be rapidly changed, whereby the natural period of oscillation of the actuator can be changed.
3. The natural period of oscillation of the actuator can also be changed by other means, including (a) the use of one or more masses that are locked and unlocked to the actuator, (b) a variable capacity inertial trap: by altering the geometry of the actuator, the volume of water contained in the actuator can be varied, (c) variation in the effective radius of motion of the actuator, (d) variation in the air/water ratio in the actuator.
4. The orbital motion of the actuator is captured by an arrangement of non-vertical taut tethers connecting the actuator to the seabed. The tethers are substantially neutrally buoyant and have low axial elasticity so that significant power losses from flexing and stretching are avoided. Power is taken off by running the tethers over pulleys. Tension in the tethers is maintained by counterweights, a spring mechanism or similar energy storage device.

Mooring with Dynamic Tuning to Wave Height

The net buoyancy of the actuator including the counterweights, where used, is arranged to be positive. The actuator is held submerged by a single mooring line: a taut vertical lower line that is fixed directly below the actuator to the seabed, for example by an easily-deployed gravity or suction anchor. The upper end of the mooring line is connected to a lower locking winch inside the actuator. The submerged depth of the actuator can be controlled by a lower locking winch that is inside the actuator shell. The lower locking winch consumes power only when repositioning the actuator, typically by 1-2 meters over the course of 10-20 minutes and can be driven by a small, highly geared electric motor. The lower line can be winched to move the actuator between the sea surface and a depth where wave action is greatly reduced: for example, 20 m below the surface. The depth can be dynamically controlled to maintain maximum power output ie reducing submersion when waves are smaller and increasing submersion when waves are larger. In severe seas, the actuator can be positioned at a safe depth. The rate of change of submersion of the actuator is preferably at least 6 m per hour (see discussion under Aims) and this is achievable using a winch as described.

The mooring line allows the actuator to follow the orbital motion of energetic swell by being sufficiently elastic: comprising at least one elastically extensible section. This section can be made of elastomer: for example synthetic (EDPM) rubber, which is resistant to seawater. A short section made of synthetic rubber is routinely used in mooring lines to absorb shock. The extensible section can be solid elastomer or multi-strand elastomer cord with an outer casing. Alternatively a drawbar helical compression spring can be inserted into the mooring line below the actuator. Drawbar helical compression springs are also commonly inserted into mooring lines to absorb shock. Such springs are usually less than a meter long. In the present invention, the extensible section provides both shock protection and sufficient travel to allow the actuator to respond to wave action in both directions, noting that this action diminishes with depth. By using a variable rate spring, adequate travel can be allowed for different levels of net buoyancy and extremes of actuator motion can be buffered.

In an example, the length of a drawbar spring is 15 m with amplitude of travel up to 5 m. To protect the spring from seawater it can be made of corrosion-proof metal such as stainless steel or of powder-coated metal or of plastic composite or the entire spring can be encased in rubber bellows. The line is connected to a pulley fixed to a rotatable shaft held in waterproof bearings in the body of the actuator and the shaft projects into the interior of the float. Inside the actuator, the rotation of this shaft is controlled by a locking winch.

In a fail-safe configuration, a slack cable is connected in parallel to the spring, so that if the spring fractures, the slack cable retains the connection between float and seabed.

In an alternative arrangement, the lower line passes directly into the interior of the actuator and the line is encased in an elastomeric bellows that is sealed at the upper end to the actuator and at the lower end to the line. Inside the actuator, the line can be passed over a pulley supported by a compression spring before attachment to the locking winch. Tension on the line compresses the spring. The length of spring required can mean that the spring extends into a casing that protrudes from the actuator.

As an alternative to a helical spring, a conical spring can be used, so allowing longer travel for a given length of spring. One or more leaf compression springs can also be used, in parallel or in series. As an example, a leaf spring of high-tensile steel or of fibre composite held by drawbars and inserted into the mooring line below the actuator, can be compressed into a bow shape by tension on the line.

It is also possible to use an air spring although this would lead to loss of energy due to compressive heating.

It is possible to design the elastically extensible section to achieve a specified fatigue life. Commercially available rubber shock cords have a fatigue life of over 5 m cycles. Rubber elastic fatigue life exceeding 100 m cycles has been reported. Using a helical spring sufficiently long to make extreme travel infrequent and using surface treatment such as shot peening, a feasible compression spring fatigue life is 10 m cycles, noting that, in lab conditions, lives of up to 1000 m cycles have been studied. The expected number of elastic cycles per year, based on the annual average swell period in representative energetic seas off the west coast of Ireland (8-9 seconds) is 3.5-4 m, indicating a feasible design life of 2-3 years. At routine intervals, an elastomeric section or spring can be easily replaced by a diver or ROV in calm conditions: first connecting the new spring in parallel to the old spring and then removing the old spring. The spring/line connectors can be designed for fast action in the manner of a carabiner.

Tuning Float: Dynamic Tuning to Swell Period

The dynamic tuning method is preferably rapid, wide-range and low cost.

The desirable speed of tuning can be estimated by considering the arrival of ocean swell from a major storm in a previously calm sea. This can result in a shift from short to long periods in as little as one hour. A not uncommon shift is 4-6 seconds. Data from ocean buoys has shown shifts as high as 12 seconds. The optimum rate of tuning depends on the balance of incremental energy capture v incremental costs. However it can be estimated that a desirable rate of tuning is at least three seconds of period per hour and preferably six seconds of period per hour.

Wide range means here the range of swell periods that characterizes energetic wave climates. Such swell periods typically vary three-fold: for example, from 5 to 15 seconds. The natural period of oscillation of the actuator varies with the square root of the ratio of the moment of inertia divided by the net restoring force, requiring a 9× variation in this ratio. Since the actuator here contains the power take off system it has a considerable fixed mass, so that a 9× variation in total mass is impractical. A 9× variation in net restoring force is feasible, but if the net restoring force becomes too low then the power take off fails. A solution is to vary both the moment of inertia and the restoring force so reducing the required range of variation in each.

Low cost means that energy consumed in tuning should be as small as possible. Prior art describes tuning by means of pumping water in and out of a floating body. Compressed air can be used to push water out of ballast tanks in the actuator, or the ballast tanks can be flooded. This method simultaneously varies the actuator mass and the actuator buoyancy. The shortest period of oscillation can be achieved by combining low mass with high net buoyancy; the longest period can be achieved by combining high mass with low net buoyancy. This method can be used for rapid tuning but it requires significant energy to displace large volumes of water against a pressure difference, the energy required increasing with depth of operation.

A preferred method of dynamic tuning to swell period is to use a surface-piercing buoyant tuning float. The tuning float can be spheroidal but preferably has a conical shape with the axis of the cone vertical and the narrower part of the cone facing downward. A taut vertical upper line connects the underside of the cone to the top of the submerged actuator. The upper line length is controlled by an upper locking winch that can be either in the conical float or in the actuator. The upper locking winch can be driven by a small, highly geared electric motor. By winching the conical float downwards, the water-plane area, and therefore the tension in the upper line and the net restoring force on the actuator, can be increased. The tension in the mooring line will be the sum of the tension in the upper line plus the net buoyant force of the actuator. If this net buoyant force is zero, then the tension in the mooring line equals the tension in the upper line and the desired three-fold tuning range can be achieved by an easily-achieved three-fold variation in the radius of the cone at the waterline. For a positive net buoyancy of the actuator, the required variation in radius at the waterline has to be greater than three-fold.

Tuning by this method combines rapidity, wide tuning range and low power requirements. Tuning speed and range can also be enhanced by combining this method with other methods described here.

The motion of the tuning float will be in phase with the motion of the actuator, but will generally be at a different amplitude. This difference in amplitude can be accommodated by using an upper line that is sufficiently elastic. Raising the tension in the upper line will also raise the tension in the lower line so that the extensible section of the lower line will elongate. This elongation can be compensated by operating the lower winch to keep the actuator at the desired depth. In general, the upper and lower locking winches are operated together.

When the actuator is raised for maintenance, the line to the tuning float can be lengthened so that the float can be pushed aside.

In summary, the actuator is held by two vertical elastically extensible lines: one connected to the tuning float on the sea surface and the other connected to the seabed. In this configuration the actuator is free to follow an orbital path.

By controlling the lower and upper locking winches, the depth of the actuator can be dynamically adjusted to change the uptake of energy in response to wave height. Additionally, the submersion of the conical float can be dynamically adjusted to change the natural oscillation period of the actuator so that this matches the swell period.

The following sequence illustrates the use of this system for tuning to wave height and swell period:

1. There is a short period swell (say 5 seconds), of low to moderate height (say less than 2 m). The lower locking winch has been used to lengthen the mooring line and the upper locking winch has been used to shorten the upper line so that the actuator is close to the surface, thereby increasing absorption of wave energy. Both winches have been operated to raise the tension on both lines and the tuning float is pulled down. The increased tension on the lines has shortened the natural oscillation period of the actuator.
2. The swell period is unchanged but the wave height increases, say to 5 m. The actuator is moved deeper but the tension on the lines is held constant.
3. The swell period rises higher to say 10 seconds and the wave height is unchanged. The tension on the lines is reduced by moving the tuning float up. The depth of the actuator remains the same.
4. The swell period rises to say 15 seconds. The tuning float is moved up further. As the tuning float is progressively disengaged, the net restoring force becomes dominated by the net buoyancy of the actuator.
5. The wave height increases to say 8 m and this is a severe sea state that risks damage to the WEC. The actuator is moved deeper. The tuning float is released to its unforced position. The upper line is slack and the lower line remains taut based on the net positive buoyancy of the actuator.

The example given above defines a severe sea state by a significant wave height of 8 m. This is arbitrary: the definition depends on the associated risk to the WEC.

The described tuning float limits the distance below the sea surface at which the actuator can operate without making contact with the tuning float: for example, this distance might be limited to 2 m. This limit can be removed if so desired: for example, by connecting the upper line to a rigid horizontal frame, with at least three axi-symmetric conical floats fixed under the periphery of the frame, the floats being on a circumference that exceeds the diameter of the actuator.

Other Methods of Dynamic Tuning to Swell Period

The actuator mass can be varied rapidly by locking or unlocking neutrally buoyant or almost neutrally buoyant bodies to the actuator (Gregory GB 2506542, 2014). A small positive or negative buoyancy can be used to move the body to or from the actuator and allows the direction of movement of the body to be reversed with the application of only a small force.

In an example, an annular body of slight negative buoyancy surrounds the mooring line. The slight negative buoyancy is sufficient for the unrestrained body to sink slowly and to require only a small force to restrain it. The desired sinking rate is determined by the desired rate of tuning and therefore the desired rate of decoupling between actuator and annular body. For example, a desired sinking rate can be in the range 1-5 m per minute. The annular body is connected by a cable to a small locking winch inside the actuator. When the winch releases the annular body to a sufficient depth, the annular body has very little influence on the oscillation of the actuator. When the winch pulls the annular body tightly against the actuator, the inertia of the annular body is coupled to the inertia of the actuator and the oscillation period falls. This method is useful for making rapid step changes in total mass but not for fine-tuning. It can be combined with the use of a tuning float, as described earlier.

More than one independently controlled annular body can be used.

The moment of inertia can also be varied rapidly by arranging for the actuator to include a fixed or variable capacity inertial trap. An inertial trap is fixed to the actuator and encloses a volume of water. It can be 'open' so that the enclosed volume is not included in the total inertial mass of the float or it can be 'closed' so that the enclosed volume is added to the total inertial mass of the float. A variable capacity inertial trap has a variable geometry so that the enclosed volume of water is variable (Gregory GB1401820.4, application 2014). Such a trap can vary total mass quickly without a large expenditure of energy.

In an example, the actuator has a cylindrical shape and fitting over it is a cylindrical cap. By moving this cap up and down using, for example, one or more rams, the volume of water trapped inside the cap can be varied and so the inertial mass of the actuator can be varied. The maximum volume of this cap can be increased by adding telescoping sections. This method does not require pumping against a significant pressure difference. As the volume of the cap is varied, water flows in and out freely through at least one open port. The number and size of such ports is limited only be the restriction that there should be no path that allows water to flow through the cap. For example, there should not be ports on opposite sides of the cap. This method of tuning is rapid, can be wide range and low energy but the range of tuning is limited if the actuator has a large fixed mass.

The moment of inertia of the actuator can also be varied by changing the radius of motion of the actuator. This requires a method for varying the effective length of the mooring line. This can be done by surrounding the mooring line with a sliding collar that can hold the mooring line in a fixed position at a variable height. The length of line above the stationary collar becomes the radius of motion of the actuator.

The collar can be held by taut, axi-symmetric cables, arranged with the same plan geometry as the actuator tethers. Each cable shares an anchor with an actuator tether: running round a pulley mounted on the anchor and terminating in a submerged tensioning float. An unconstrained collar would rapidly descend to the seabed as the floats rise. The collar is prevented from descending by a single cable connecting the collar to a slocking collar winch in the base of the actuator. By operating this winch, the collar can be positioned at any determined height along the mooring line.

To ensure that the mooring line is held firmly in place by the collar, each cable runs through a remotely controlled locking mechanism: for example, a commercially available cam cleat, used for fast and secure gripping of marine cables. The cam cleat can be modified by fixing to it a remotely controlled solenoid mechanism. An electric cable from the solenoid to the actuator enables the cable to locked in place or released. The modified cam cleat is mounted on the anchor next to the pulley. When the collar is being moved, these locks are open. When the collar is stationary, these locks are closed. This method enables rapid tuning to wave period without large expenditure of energy. Using this method for tuning at long periods may require lengths that exceed the average depth of the continental shelf (see previous discussion). This limitation can be avoided by combining variation in length of mooring line with other tuning methods. A deficiency of this method is that it tunes in the surge vector only.

Power Take Off

The actuator preferably presents similar geometry to orbital water motion from any direction: for example, it can be spheroidal. Power is taken from the motion of the actuator using at least three taut axi-symmetric tethers, each arranged at an angle to the vertical, that connect the actuator to the seabed, preferably using low cost, easily deployed anchors.

In an example, the anchors are gravity (deadweight) anchors made of reinforced concrete. Lacking any penetration of the seabed, such an anchor is not ideal for resisting sideways forces. A recent variant of the gravity anchor is better suited to this: it is shaped like a torpedo with stabilizing fins and penetrates the seabed on impact when dropped. Such a torpedo anchor can also be given a nose geometry that opens up into a scoop when the torpedo is pulled upwards. Such an anchor is non-recoverable.

In another example, the anchors are suction pile anchors, typically made in the form of a metal cylinder. A suction pile anchor has a skirt that is driven into the seabed. Water is then pumped out from under the skirt. This kind of anchor resists both vertical and sideways pull and so is suited to a taut and non-vertical mooring. Being mainly covered with soft sediment, most of the continental shelf is suited to a suction anchor.

The features of gravity and suction pile anchors can be combined by fixing a sharp-edged skirt to a concrete gravity anchor and arranging one or more one-way valves above the skirt. As the gravity anchor presses down, the skirt penetrates the seabed and water under the skirt is expelled.

A Vertical Load Anchor (VLA) is also suited to the present invention. When dragged sideways on the seabed, unlike a conventional drag anchor, the VLA anchor buries itself and subsequently resists vertical forces. It accepts loads from any direction.

A commercially available self-installing scoop anchor is also suitable, with a high holding capacity that is independent of anchor line inclination. The anchor has a variable geometry. Initially arranged in the shape of an open cylindrical section, the anchor is mounted on the end of heavy cylinder (a suction pile follower or SPF) so that there is a clear passage through both anchor and cylinder. The assembly of anchor and cylinder is sunk into the seabed. When the SPF is retracted, the anchor unfolds into a pair of semi-cylindrical scoops that hold the anchor embedded in the seabed. This is a low cost solution: the SPF is rentable, the anchors are small, easily fabricated and transported and proof-testing can be performed in situ.

The tethers are arranged axi-symmetrically at an angle of between 30 and 60 degrees to the horizontal and preferably at 45 degrees to the horizontal. The tethers are arranged to be taut and are made of a high tensile strength, high tensile modulus material with an average specific density close to that of seawater (typically 1.02 to 1.03), providing substantially neutral buoyancy so that gravitational flexing (either sagging or rising) can be avoided. Taut tethers are used in tension leg platforms (TLPs), applied in offshore drilling since the 1980s. TLP tethers have been used in water up to 1400 m deep and comprise steel wire rope or multiple linked sections constructed of steel tube or forged steel box structures. Prior art describes composite tethers that reinforce steel with, for example, carbon fibre and also tethers that comprise carbon fibre reinforced plastic. TLP tethers provide a vertical connection under tension between a buoyant platform and anchors on the seabed. The axial elastic elongation of such tethers is very small. For operation of the present invention over the continental shelf it is also possible to use tethers made, at least in part, of a flexible, low-stretch polymeric cable.

At least the upper section of each tether must be flexible, being looped round a pulley fixed to a rotatable shaft that is held in water-proof bearings—for example, standard propeller shaft bearings—in the body of the actuator. The shaft projects into the interior of the actuator so that rotation of the shaft can be captured by a power system inside the actuator shell. To avoid bending damage to the tether, the diameter of the pulley is at least 15× the diameter of the section of the tether that engages the pulley and preferably more than 20× the diameter. Tethers can be jacketed, for example, with rubber, to improve grip on the pulley. To improve grip and reduce wear of the tether at the pulley, the upper section of the tether can terminate in a belt that can be, for example, v-shaped in cross-section or toothed. In the former case the pulley channel is also v-shaped. In the latter case, the teeth engage with an indented pulley.

Each tether is arranged to be held under tension. As an example each tether terminates in a dense, streamlined counterweight mass that is suspended with sufficient length of tether to permit freedom of motion of the actuator including movement of the actuator to and from the sea surface. Counterweights hold the tethers at a steady tension so that wear on the tethers and on the drive system is reduced.

Each counterweight can be arranged to slide up and down a rigid guide rail that is fixed to the underside of the actuator, so reducing the risk of troublesome oscillation of counterweights. Alternatively each counterweight can slide along an elastic line between the actuator and the seabed. Since such a line has only a guidance function, it can be light and inexpensive.

Alternatively, each tether terminates by being fixed to and wrapped round the circumference of a wheel that rotates on a shaft fixed to an elastic member that stores energy when the shaft rotates. For example, the elastic member can be a torsion spring. When the tether is pulled, the wheel rotates and the spring becomes loaded. This is the familiar mechanism of the garage door counter-balance and of the cable retractor in, for example, a vacuum cleaner. A typical torsion spring is made of helical metal wire or spiral metal sheet. A proprietary alternative uses shaped elastomer and claims significant advantages both in fatigue life (over 2.5 million cycles) and in avoidance of catastrophic failure. In an alternative configuration of such energy storage, the shaft turns a reversible rotary hydraulic pump that charges a pneumatic accumulator.

Tether Material and Construction

With suitable selection of the tether material and dimensions, the loss of useful power due to stretching and flexing of the tethers can be made small. The preferred tether material combines high tensile strength with high tensile modulus (ratio of stress to elastic deformation).

As an example, rope made with steel wire is commonly used for mooring lines. Wire made of suitable steel alloy has a high tensile strength (0.8-1.9 GPa) and high tensile modulus (150-210 GPa).

Let E=the tensile modulus in newtons per $m^2$
T=the tension in the rope in newtons (kg force)
A=the cross-section area of the tether in $m^2$
R=elastic axial elongation as a ratio to the length of the non-tensioned rope
Then:

$$E=T/AR \text{ or} \qquad\qquad 1.$$

$$A=T/ER \qquad\qquad 2.$$

Let E=210 GPa=$210\times10^9$ newtons/$m^2$

If we assume the rope is at a 45 degree angle extending to the typical depth limit of the continental shelf, 150 m, then the length of rope is 212 m. If we restrict the elastic elongation of this rope to 0.2 m ie 0.1% then:

$$R=0.2/212=0.001$$

Hence from equation 2:

$$A=T/(210\times10^6) \ m^2 \qquad\qquad 3.$$

Also let P=the power delivered by a single tether
V=average velocity of tether; then:

$$P=TV \text{ or} \qquad\qquad 4.$$

$$T=PN \qquad\qquad 5.$$

Simplifying, we assume that a single tether runs over a pulley in a reciprocating motion, with an average stroke length of 3 m and period of 8 seconds, so that V=6/8=0.75 mps The force difference across the pulley on the up-stroke is T-C where C is the force exerted by the counterweight and on the down-stroke, the force difference is C so that the average force difference is T/2

If we want a single tether to deliver 50 kW, then, from equation 5:

$$T/2=50000/0.75 \text{ or } T=133000 \text{ newtons} \qquad\qquad 6.$$

And from equation 3:

$$A=133,000/(210\times10^6) \ m^2=0.00063 \ m^2=6.3 \ cm^2 \text{ ie a steel rope of 2.8 cm diameter.} \qquad 7.$$

The vertical movement resulting from 0.2 m variation in tether length at a 45 degree angle is 0.14 m. In a typical energetic wave climate, less than 0.5% of annual wave energy is from waves under 0.5 m and most WECs are inactive at this wave height, so the effect of elastic elongation to 0.14 m at low wave heights is not significant. A large proportion of annual wave energy in an energetic wave climate is derived from waves that are 3-5 m high. Vertical elastic movement of 0.14 m can reduce the power capture at these wave heights by around 5-10%. The optimum level of power loss depends on the value of incremental power v. the incremental cost of tethers with reduced elongation.

Steel rope is well understood in marine applications and such rope can be low-maintenance: rope made of jacketed galvanized steel strand with zinc filler wires has an estimated life in seawater of over 30 years. But steel has specific density of 7.86 so that gravitational sagging in seawater can be significant. Also the resistance to bending of such steel rope can make it unsuitable for connection to a power take off that uses a pulley system as described here.

Both of these problems can be solved by using a hybrid tether with modified buoyancy. A hybrid tether is constructed in two sections. The lower section is not arranged to run over a pulley and can, for example, be bend-resisting steel rope or can be solid steel. The upper section of the hybrid tether must be sufficiently flexible and sufficiently resistant to bending fatigue to operate the pulley of the PTO system of the present invention. For example, the upper section can be flexible rope made of polymer fibre. Both lower and upper sections are modified to achieve neutral buoyancy.

Substantially neutral buoyancy that reduces gravitational flexing to insignificant levels can be achieved by arranging to provide the steel section of the tether with some form of additional buoyancy distributed uniformly along the tether. As an example, steel rope can be braided round a flexible pressure-resisting and fluid-tight tubular core with a density significantly lower than seawater. The core can comprise flexible plastic tube, reinforced with spiral steel wire and filled with flexible closed-cell plastic foam. The same method can be applied to ropes made with other materials having a density higher than seawater. A similar method achieves neutral buoyancy by braiding material that is less dense than seawater round a core that is denser than seawater.

As another example, neutral buoyancy can be achieved by winding a buoyant pressure-resisting fluid-tight hollow strip in a spiral round the steel rope. The strip can be tubular. By injecting a suitable setting foam—for example, polyurethane foam—a flexible spiral strip or tube can be made rigid, fixing it in place. The spiral does not bear a significant axial load but must resist water pressure. It can be made, for example, of extruded cross-linked polythene. The spiral can be wound on to standard steel rope at the dockside or the spirally sheathed steel rope can be pre-manufactured, for example with the addition of an outer sleeve. Such a spiral distributed flotation system can be used to render a tether made of any material that is denser than seawater neutrally buoyant. Likewise, a spiral distributed weighting system can be used to render a tether made of any material that is less dense than seawater neutrally buoyant.

The lower section of a hybrid tether can also be made of solid steel. By using hollow steel tube of suitable dimensions, the lower section can be made neutrally buoyant. Alternatively, the tube can be filled with a material with a density significantly less than seawater. As an example, such material can be closed cell plastic foam such as polyurethane foam (specific density 0.01 to 0.1). A rigid foam can significantly reinforce the tube. Use of tethers made of neutrally buoyant hollow steel tube is known in TLPs and is to facilitate deployment. In the present invention, the primary purpose of neutral buoyancy is to avoid losses in power extraction that arise from gravitational flexing of the tether.

Twisting and bending stresses in the lower section of the tether can be reduced by using a connector between tether and anchor that is free to rotate both round the axis of the tether and round axes at right angles to the axis of the tether and by using similar connectors between sub-sections and between the lower section and the upper section.

The lower section of the tether can also be made of other metals or of solid composite material such as fibre-reinforced plastic (FRP), using, for example, carbon fibre.

A number of high tensile strength, high modulus flexible polymer fibres can be used to construct all or part of the tethers. The tensile properties of such fibres vary with method of production.

For example, liquid crystal polyester fibre (trade name Vectran) has a tensile strength of 1.1-3.2 GPa, a tensile modulus of 50-100 GPa and a specific density of 1.4. Vectran fibre rope can be made neutrally buoyant using a distributed flotation system as already described. Commercially available marine ropes include examples of modified density: hollow braided fibre enclosing crimped lead or closed-cell rigid plastic foam. By using Vectran fibre braid over flexible closed cell foam, neutral buoyancy of a flexible rope can be achieved.

High modulus polythene fibre (trade names Dyneema and Spectra) has tensile strength 1.4-3.1 GPa, a tensile modulus 50-170 GPa and a specific density of 0.97. In this case, the rope can be made neutrally buoyant by using a uniformly distributed weighting system. For example, a Dyneema rope can be made neutrally buoyant by embedding a denser fibre or wire or by encasing the Dyneema in a jacket that includes denser fibre or wire. Commercially available marine ropes made of Dyneema include variants that comprise parallel cores of Dyneema rope encased in polyester braid (specific density 1.4): this outer braid improves grip over winch drums and the like. By combining parallel cores of Dyneema and Vectran or by adjusting the proportions of the inner Dyneema braid and the outer polyester braid, or by mixing Dyneema into the outer braid, neutral buoyancy can be achieved.

Aramid copolymer fibre (trade names Kevlar, Twaron and Technora) has tensile strength 1.7-3.4 GPa, a tensile modulus 70-160 GPa and a specific density of 1.44. Kevlar, for example, can be used like Vectran above.

In selecting a suitable tether material, bending fatigue must also be considered since the upper section of the tether turns a pulley. In this respect, Dyneema appears more suitable than either Vectran or aramid fibre.

Ropes made of other polymers such as polypropylene, nylon and conventional polyester fibre are less suitable than the polymers mentioned above for the purpose of the present invention, being of significantly lower tensile strength and lower tensile modulus.

By using larger tether cross-sections, the % elongation of tethers can be reduced as desired, enabling operation at higher reaction efficiency and/or in principle at depths exceeding 150 m. A limit to increased cross-sections is set by the increased costs of purchase, deployment and operation.

In the case of a 212 m tether and an actuator that can be moved between the sea surface and a depth of 20 m, the total tether length to the counterweight is around 220 m. The upper, flexible section of a hybrid tether is around 40 m long and the lower, more rigid section of the tether is around 180 m long or 82% of the total length. The rigid lower section can be designed with confidence and high reliability based on extensive TLP experience. Additionally, hollow steel tube, for example, is a relatively cheap commodity, with an estimated cost per meter that is around half that of equivalent steel rope and over 10× cheaper than equivalent high modulus polymer rope. Reduction in total stretch of the tether can be most cost-effectively achieved by increasing the cross-section of the lower section. By designing the lower section of the tether for a multi-year life, the main routine service required for the tethers—inspection and replacement of the upper sections—can be carried out in water under 40 m deep by divers without special protocols.

In summary, the present invention allows efficient direct reaction against the seabed in water at depths that characterise the continental shelf, where the opportunity for low LCOE is greatest. Efficient direct reaction is achieved by restricting axial elongation of the tethers when under tension: by using tethers of high tensile strength (exceeding 0.5 GPa and preferably exceeding 1.5 GPa) and high tensile modulus (exceeding 50 GPa and preferably exceeding 100 GPa) and by designing the tethers to achieve substantially neutral buoyancy. A hybrid tether can be used: this has a lower section that is insufficiently flexible to run over a pulley as described in the present invention and an upper section that is sufficiently flexible for this purpose. A hybrid tether can provide improved reliability and reduced capital and operating cost.

Power System

The axi-symmetric tethers drive the pulley shafts into rotating oscillation as the actuator moves in response to wave action. Each pulley shaft is arranged to drive a drive shaft inside the shell of the actuator. The rotating oscillation of each drive shaft is rectified: for example, by means of a pair of one-way clutches: one that free-wheels clockwise and the other free-wheeling counterclockwise. The two clutches drive a second drive shaft by means of gears that reverse one of the rotations. A flywheel on the second shaft smooths the resulting one-way rotation and this is transmitted by a suitable gear train to a drive train, generator and power conditioning arrangement. A standard wind turbine power system can be used. The power system can be arranged so that the main shaft of the generator is along the vertical axis of the actuator and the multiple drive shafts are arranged radially, the driving shafts and the main shaft being linked by bevel gears.

Alternatively the motion of the axi-symmetric tethers can be rectified by using a hydraulic system. For example, each oscillating pulley shaft drives a rotary hydraulic pump. The pressurised hydraulic fluid from all the pumps is smoothed via a pneumatic accumulator and drives a rotary engine.

Control System

The actuator can be controlled by radio signals using an aerial that is attached to a buoy or to the conical tuning float that is described above. For example, the actuator can be instructed to unlock the lower winch controlling the mooring line and to take in air from a floating snorkel and blow this air into ballast tanks so that the actuator rises to the surface. At the surface, an upper hatch in the actuator can be opened, giving sufficient access to allow inspection and parts replacement.

The control system for the actuator requires the means to receive external predictions of wave height and swell period and/or local sensors that measure wave height and period and actuator motion. External predictions are readily available and can be radioed to the device. Suitable sensors are also readily available, being commonly used on ocean monitoring buoys. The control system also requires sensing of the depth of the actuator: this can be done by measuring water pressure.

Deployment

The device is easily deployed. For example, gravity anchors, preferably with skirts, can be constructed of blocks of reinforced concrete at the dock-side and can incorporate floodable cells that permit the anchors to be floated and towed to the sea location using a tug.

The drop points for the anchors can be identified using GPS coordinates. Then at each drop point, a line is attached to the top of each anchor and the other end of this line is fixed to a small buoy. The cells in each anchor are slowly flooded, starting with the lower cells to ensure the anchor descends upright. When all the anchors are sunk to the seabed, there will be at least three axi-symmetric outer buoys each connected to outer anchors by outer lines and a central buoy, attached to a central anchor by a central line. A tug tows a buoyant actuator to the central buoy and a diver fixes the central line to the central pulley under the actuator. Each outer line is pulled to the centre and the diver threads each outer line over an outer pulley under the actuator. Each outer line is then pulled on to an adjacent vessel, where the end of each line is fixed to a counterweight and released into the sea.

In an alternative method, the actuator is carried to its desired location on top of a seagoing platform and the lines are attached without a diver. A crane places the actuator in the sea.

The stability of gravity anchors on the seabed can be increased by linking the anchor blocks with rigid beams. In this case the entire assembly of blocks and beams can be deployed at the same time.

The described anchors can be retrieved by connecting the anchors to floats, connecting the floodable cells to air hoses, and, where applicable, pumping water under the skirts, so allowing the WEC to be relocated.

If VLA anchors are used, a similar procedure is followed, except that each anchor must be dragged into position.

If scoop anchors are used, a similar procedure is followed, except that each anchor is installed in turn using an SPF. Scoop anchors cannot be retrieved.

If hybrid tethers are used, the rigid sections, which are neutrally buoyant, can be assembled at the dock, attached to a series of floats and towed to the drop site.

When the buoyant actuator is in the sea, the tuning float is attached and the lower winch in the actuator is operated so that the actuator is submerged to a selected depth. The lower and upper winches are operated to bring the upper line and the mooring line to a selected tension. The counterweights ensure that for any position of the actuator, the tethers remain taut.

Operation Beyond the Continental Shelf

The present invention describes advantages in achieving fast, wide range and low cost tuning to wave height and period while avoiding the use of a floating submerged platform over the depths that characterize the continental shelf. However, in an instance where it is desirable to operate at a greater depth, for example 500m deep water over the edge of the continental shelf, the present invention is easily adapted to use a submerged platform, with a significant advantage over prior art, in that dynamic tuning to both wave height and wave period can be achieved while keeping the platform stationary in quiet water.

For example, a submerged platform is held stationary in quiet water by a combination of positive buoyancy and taut mooring lines to the seabed or by a combination of negative buoyancy and taut lines to floats. In the former case the present invention can be adapted by using the described hybrid tethers to moor the platform rigidly to the seabed. The platform can be made to resist motion by using known methods of scale and mass. The present invention can be adapted by fixing the mooring line of the actuator to the platform and by using a tuning float as already described.

This arrangement permits dynamic, low-energy tuning both to wave height and wave period. Instead of running the axi-symmetric tethers over pulleys fixed to the actuator, the tethers can be fixed directly to the actuator and run over pulleys on the platform, terminating in streamlined counterweights. The rotation of the pulleys drives the power train, as before.

In this configuration, it is possible to have no working parts inside the actuator. The reduced fixed mass of such an actuator makes it possible to achieve a wider range of tuning using variation in mass alone. A different version of a variable capacity inertial trap can be used and the entire actuator can be given a variable geometry that is suited to omnidirectional motion. For example, a sheaf of identical, parallel, flexible struts are joined by pleated elastic material. When the ends of the sheaf are pressed together, the struts bow outwards so that the sheaf deforms first into a spindle shape and then into a spheroidal shape. As this occurs the volume inside the bowing device steadily grows. One of the ends of the sheaf can be kept open so that water flows freely in and out. In this fashion, the mass of the actuator can be varied dynamically over a wide range with lower energy consumption than required to force water in and out of a vessel against a pressure difference.

Scope

The scope of the present invention is not limited to the specific instances given. For example, the present invention describes a power take off system that uses pulleys. This can be substituted by an arrangement of pistons or of rack and pinion devices. Likewise the present invention describes a variable capacity inertial trap comprising a telescoping cylinder with expansion and contraction of the cylinder driven by telescoping rams. Alternative motive devices include screw jacks and winched lines operating against springs. The present invention also describes locking an annular, (almost) neutrally buoyant body to the lower part of the actuator in order to vary the actuator mass. Such a mass can be non-annular and plural masses can be used and can be locked to other parts of the actuator.

BRIEF DESCRIPTION OF FIGURES

Figures are schematic and not to scale.

FIG. 1. Side cross-section of WEC with four axi-symmetric tethers, counterweights and tuning float.

FIG. 4. Side view of hybrid tether

FIG. 5a. Side cross-section of actuator showing variable capacity inertial trap with trap almost empty.

FIG. 5b. Side cross-section of actuator showing variable capacity inertial trap with trap full.

FIG. 6. Side cross-section of WEC showing arrangement for varying the effective radius of oscillation of the actuator FIG. 7. Side cross-section of WEC showing locking mass FIG. 8. Side cross-section of actuator showing arrangement for varying mass and net buoyancy.

FIG. 9. Side cross-section of WEC showing connection to submerged floating platform FIG. 10a. Side cross-section of variable capacity inertial trap using bowing struts: low contained volume FIG. 10b. Side cross-section of variable capacity inertial trap using bowing struts: high contained volume FIG. 10c. Plan of variable capacity inertial trap: high contained volume.

DETAILED DESCRIPTION OF FIGURES

Figure 2A:
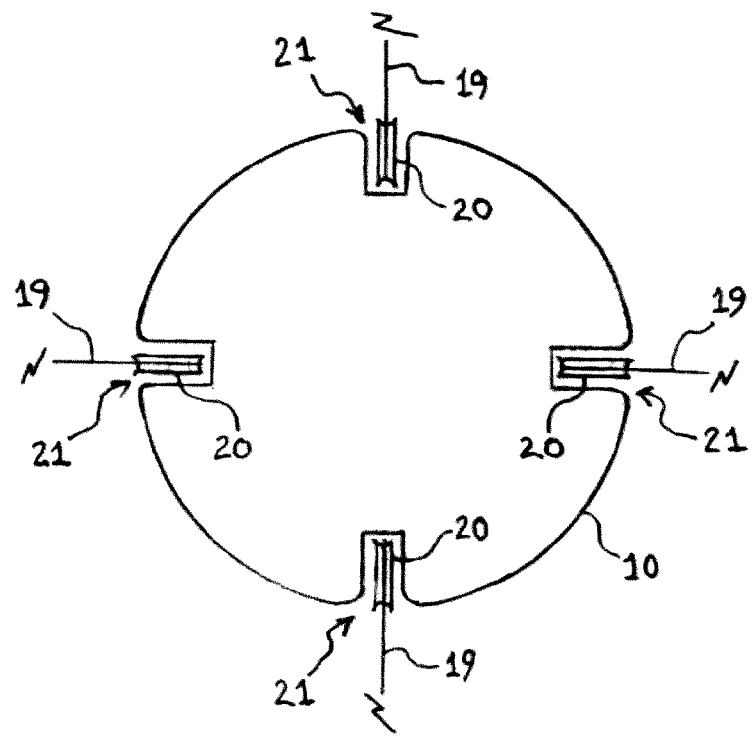
FIG. 2a. Plan showing actuator with pulleys

FIG. 1. Side Cross-Section of WEC with Four Axi-Symmetric Tethers, Counterweights and Tuning Float.

The actuator (10) is a sealed, rigid, hollow, positively buoyant submerged vessel of preferably spheroidal shape. The actuator (10) is moored to the seabed (11) by a substantially vertical taut mooring line (12) that at the lower end is connected by a swivelling link (not shown) to an anchor (13) and at the upper end is connected to a lower locking winch (14) inside the lower part of the actuator (10). The connection of the mooring line (12) to the lower locking winch (14) is via a shaft (not shown) projecting through the exterior wall of the actuator (10), the method of connection being indicated in FIG. 2b. The mooring line (12) is elastically extensible to a degree sufficient to allow the actuator (10) to follow the orbital motion of energetic swell, the actuator (10) having at least one elastic section (not shown) that can be, for example, a length of elastomer, a length of elastomeric rope or a spring arranged to be under variable compression.

The actuator (10) is connected to a conical tuning float (15) floating on the sea surface (16) by a substantially vertical taut upper line (17) that is connected at the lower end to an upper locking winch (18) inside the upper part of the actuator (10). The connection of the upper line (17) to the upper locking winch (18) is via a shaft (not shown) projecting through the exterior wall of the actuator (10), the method of connection being indicated in FIG. 2b. The upper line (17) is elastically extensible to a degree sufficient to allow the actuator (10) to follow the orbital motion of energetic swell, the upper line (17) having at least one elastic section (not shown).

Four axi-symmetric tethers (19) (two are shown) are held taut at an angle between 30 and 60 degrees to the horizontal and preferably at 45 degrees to the horizontal so that each tether (19) is at 90 degrees angle to the tether (19) on the opposite side of the actuator (10) when the actuator (10) is at rest. Each tether (19) is constructed to combine low elastic elongation with neutral buoyancy so that percentage of available power lost from stretching and flexing of the tether (19) is made very small: preferably less than 5%. The lower part of each tether is fixed to an anchor (13) on the seabed (11). The upper part of each tether is flexible and passes round a pulley (110) that is fixed to and rotates on a shaft (not shown). The shaft (not shown) passes through the wall of the actuator (10) and drives a power system (not shown) inside the actuator (10). The upper part of each tether terminates in a streamlined counterweight (111)

By operating the lower locking winch (14), the level of submersion of the actuator (10) can be dynamically varied from a surface-piercing position to a position in quiet water: at least 20 m deep.

By operating the upper locking winch (18) the waterplane area of the conical float (15) can be dynamically varied, changing the tension on both the upper line (17) and the mooring line (12) and therefore changing the natural oscillation period of the actuator (10).

The orbital motion of the actuator (10) is damped by the tethers (19), which transmit power to the power system (not shown) inside the actuator (10).

FIG. 2a Plan View Showing Actuator with Pulleys

This view shows only the arrangement of the pulleys (20) in the actuator (10). Four pulleys (20) are arranged axi-symmetrically around the vertical axis of the actuator (10). Each pulley (20) is fixed in a recess (21) in the exterior wall of the actuator (10). Running round each pulley (20) is a tether (19). Any number of pulleys greater than three arranged axi-symmetrically can be used. Variants differing from four pulleys are not shown.

Motion of the actuator (10) caused by the orbital motion of energetic swell results in movement of the tethers (19) over the pulleys (20). Power is transmitted to a power system (not shown) inside the actuator (10).

Figure 2B:
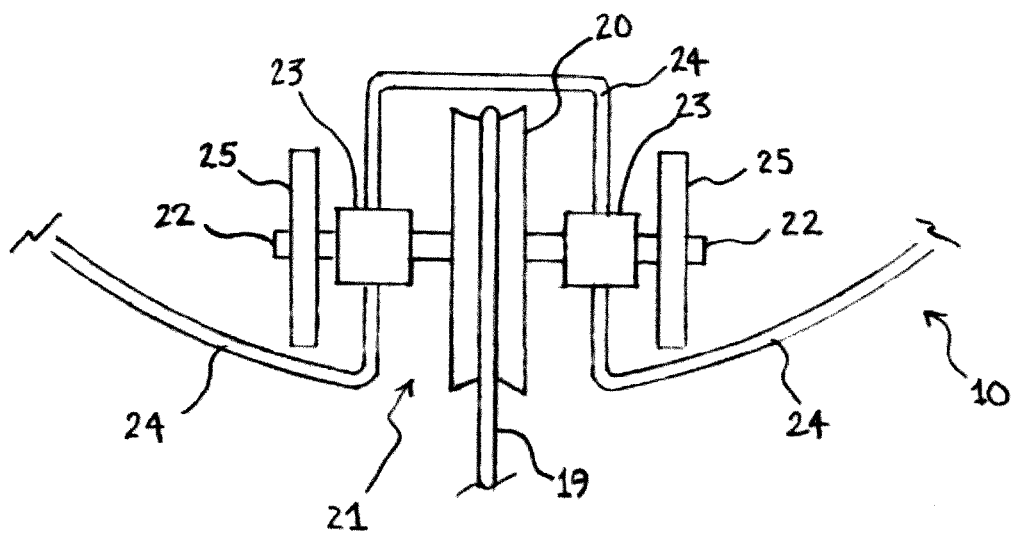
FIG. 2b. Plan cut-away showing connection of pulley shaft to actuator interior

FIG. 2b. Plan Cut Away View Showing Detail of Connection of Pulley Shaft to Actuator Interior Each pulley (20) is fixed to and rotates with a pulley shaft (22) that is held in water-proof bearings (23) fixed in a recess (21) in the exterior wall (24: cut away) of the actuator (10). Inside the actuator (10), each end of the pulley shaft (22) is fixed to a gear wheel (25) that rotates with the shaft (22). The gear wheels (25) transmit power to the power system (not shown).

Figure 3A:
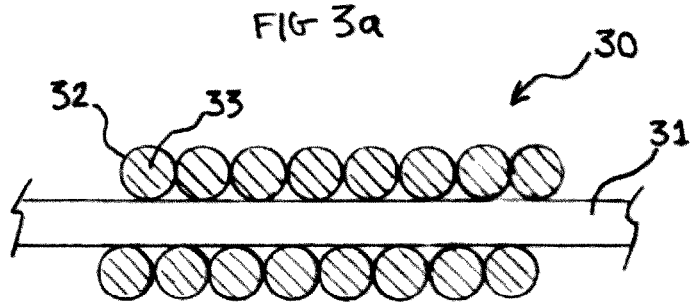
FIG. 3a. Side cross-section of tube with spiral sheath

FIG. 3a. Side Cross-Section of Steel Wire Rope with Spiral Sheath

A neutrally buoyant tether (30) comprises steel wire rope (31) with a closely wound spiral sheath of tubing (32) shown here with a rigid closed-cell foam core (33) that reinforces the tube (32) and ensures that it is fluid-tight. The spiral sheath (32) has sufficient strength to resist compression at anchor depth. The outer diameter of the sheathed tether (30) exceeds 3× the diameter of the rope (31).

Figure 3B:
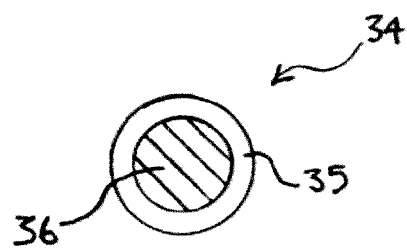
FIG. 3b. End cross-section of tube with rigid foam core

FIG. 3b. End Cross-Section of Steel Tube with Rigid Foam Core

A neutrally buoyant solid tether (34) comprises a hollow steel tube (35) filled with a rigid closed-cell foam (36) that reinforces the tube (35) and ensures the tube (35) is fluid-tight. The tube (35) has sufficient strength to resist compression at anchor depth. The outer diameter of the tube (35) exceeds 30× the thickness of the wall of the tube.

Figure 3C:
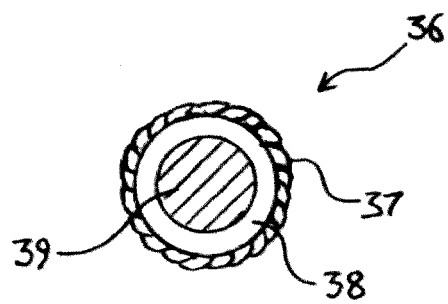
FIG. 3c. End cross-section of polymer braid round flexible foam core

FIG. 3c. End Cross-Section of Braid Round Flexible Tubular Core

A neutrally buoyant flexible tether (36) comprises a braid (37) of wire or fibre with density greater than seawater surrounding a reinforced flexible tube (38) filled with closed-cell flexible foam (39). The tube (38) has sufficient strength to resist compression at anchor depth.

Figure 3D:
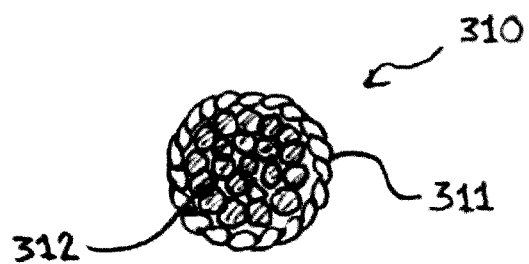
FIG. 3d. End cross-section of polymer braid round parallel fibre core

FIG. 3d. End Cross-Section of Polymer Braid Round Parallel Fibre Core

A neutrally buoyant flexible tether (310) comprises a polymer braid (311) over a core of parallel twisted fibres (312) and the mixture of fibres of different densities in the braid (311) and in the core (312) provides neutral buoyancy.

FIG. 4. Side View of Hybrid Tether.

A hybrid tether (40) comprises a lower section made of hollow steel tube (41) and an upper section made of flexible rope (42) made of high modulus polymer fibre. The sections (41, 42) are connected by a swiveling link (43) that can be easily connected and disconnected, allowing easy inspection and replacement of the upper section. Both the lower section (41) and the upper section (42) are arranged to be neutrally buoyant and to have very low total elongation (preferably less than 0.2 m absolute extension) under the operating tension of the tether (40). The hollow tube (41) is made neutrally buoyant by, for example, selecting the inner and outer diameters of the tube (41). The upper section (42) is made neutrally buoyant by, for example, combining polymer fibres that are more and less dense than seawater. The lower section (41) is connected to an anchor (13) by a swiveling link (43). The flexible upper section (42) runs over a pulley (110: the actuator and so on are omitted) and is terminated in a streamlined counterweight (111).

FIG. 5a Side Cross-Section of Actuator Showing Variable Capacity Inertial Trap with Trap Almost Empty.

The actuator (10) has an upper geometry that is a cylindrical (tethers (19), mooring line (12) and other detail are omitted). A rigid cap (50) fits over this upper geometry so that it can slide up and down the actuator (10). To provide strength to the trap, the cap (50) can slide on a rigid exterior frame (not shown). The cap (50) also fits inside a telescoping rigid outer cylindrical section (51) that has a seal (52) against the actuator wall. The cap (50) has an axial port (53) through which passes the upper line (17). Water can flow freely through the port (53). The upper line (17) is connected to the upper locking winch (18: not shown), which in this instance is inside the conical tuning float (15: not shown) and the upper line (17) is also connected to the top of the actuator (10). At least three axi-symmetric telescoping rams (54: two out of a set of four are shown) connect the cap (50) to the outer wall of the actuator (10). The cap (50) is shown pulled towards the main body of the actuator (10), so that water trapped (55, shown hatched) by the cap (50) is small. The volume of trapped water (55) is reduced by mounting the telescoping rams (54) in recesses (56) in the wall of the actuator (10). The maximum extension of the cap (50) is set by stops (57) in the wall of the actuator (10).

FIG. 5b Side Cross-Section of Actuator Showing Variable Capacity Inertial Trap with Trap Full.

The cap (50) and the telescoping section (51) are shown pushed away from the main body of the actuator (10) by the extended rams (54). Water has flowed into the cap (50) through the axial port (53) and the water trapped (55, shown hatched) by the cap (50) is increased.

By operating the rams (54), the total mass of the actuator (10) can be varied rapidly, so that the natural oscillation period of the actuator can be varied dynamically. Energy is expended moving a volume of water over almost zero pressure gradient and against a small resistance. Compared with the energy required to compress air and blow water out at depth, the energy required is small.

Access to the top of the actuator (10) for servicing is not impeded by the cap (50), which has a lockable access hatch (not shown) that is positioned over a similar access hatch (not shown) in the upper part of the actuator (10).

FIG. 6 Side Cross-Section of WEC Showing Arrangement for Varying the Effective Radius of Oscillation of the Actuator A rigid collar (60) is fixed slidably to the mooring line (12). Fixed to the collar are axi-symmetric cables (61: two are shown) that are aligned with the actuator tethers (19: not shown) and pass round pulleys (62) attached to the anchors (13). The cables (61) terminate in submerged floats (63) that keep the cables (61) under tension. The collar (60) is fixed to a collar line (64) that is connected to a locking collar winch (65) inside the lower part of the actuator (10). By operating the collar winch (65) the collar is raised or lowered, so changing the effective radius of oscillation of the actuator (10). In order to lock the collar (60) in a selected position, the cables (61) run through remotely controlled locking devices (66) mounted on the anchors (13). These devices (66) can be lockable cam cleats controlled by solenoids (detail not shown). This arrangement enables rapid adjustment of the period of oscillation of the actuator (10) with small consumption of energy.

Figure 7:
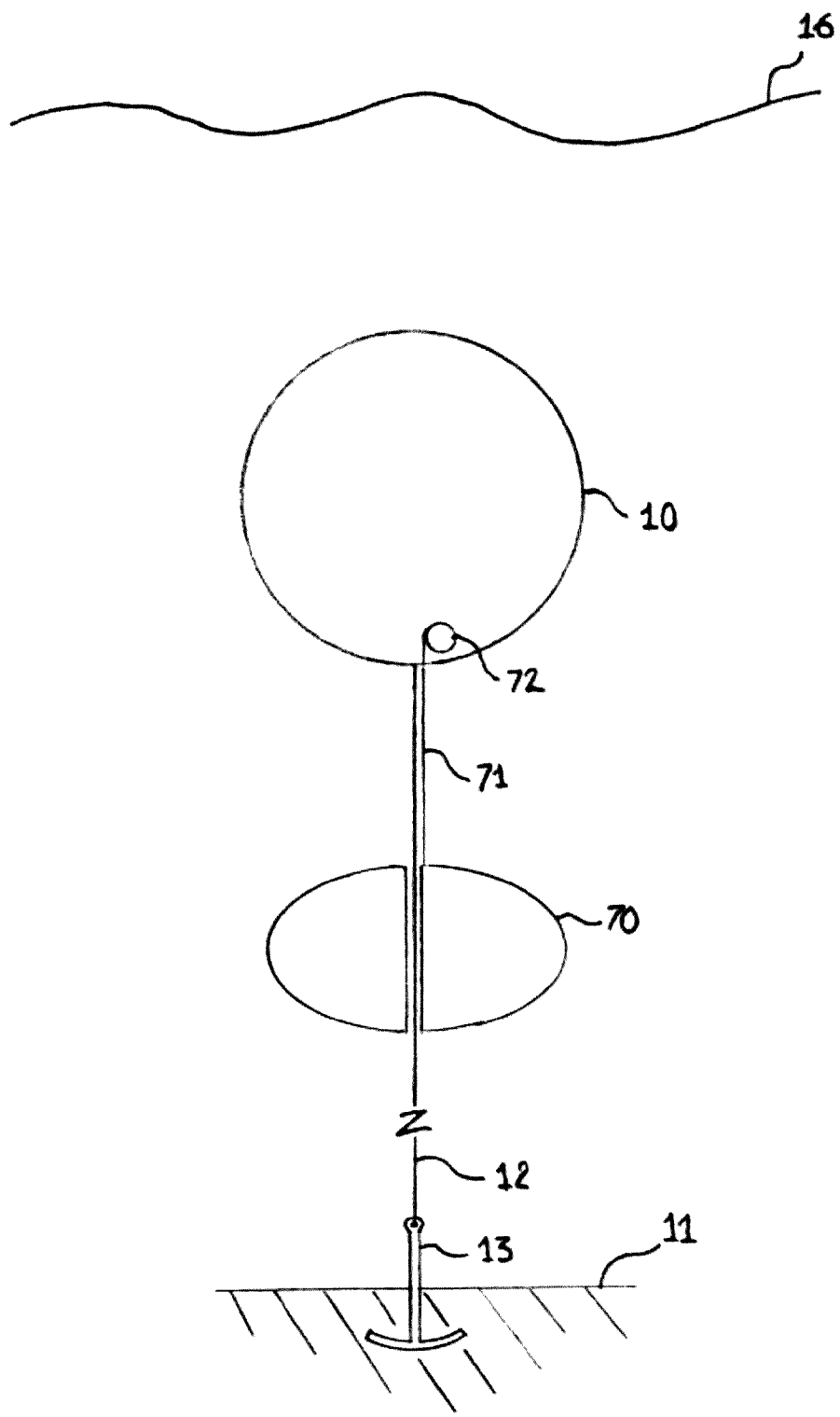

This tuning method is compatible with the tuning methods described under FIGS. 5, 8 and 9 but not the method described under FIG. 7.

FIG. 7. Side Cross-Section of WEC Showing Locking Mass (Tethers (19), tuning float (15), lower winch and other detail is omitted). An annular body (70) of slightly negative buoyancy is constructed of a light rigid shell full of water and surrounds the mooring line (12). The annular body (70) is able to move freely up and down the mooring line (12). The annular body (70) is connected by a cable (71) to a small locking mass winch (72) in the lower part of the actuator (10). The mass winch (72) can release the annular body (70) to a depth where it has negligible influence on the motion of the actuator (10) or it can raise the annular body until it is pulled tightly against the lower exterior of the actuator (10), at which point the mass of the annular body (70) is added to the mass of the actuator (10) and so raises the natural oscillation period of the actuator (10).

FIG. 8. Side Cross-Section of Actuator Showing Arrangement for Varying Mass and Net Buoyancy.

(Tethers (19), mooring line (12), tuning float (15) and other detail is omitted). The actuator (10) has an interior fluid-tight annular volume (80). An upper valve (81) and a lower valve (82) connect this volume (80) to the sea. An electric air pump (83) is located inside the actuator (10). The pump (83) draws in air through a flexible hose (84) from a floating snorkel (85). The outlet of the pump (83) is connected to the annular volume (80) by a duct (86).

The ratio of water to air in the annular volume (80) can be reduced by closing the upper valve (81) and opening the lower valve (82) and by using the air pump (83) to blow water out of the lower valve (82). The ratio of water to air in in the annular volume (80) can be increased by stopping the pump (83) and opening both the upper valve (81) and the lower valve (82). In this case, air exhausts through the upper valve (81) and water flows into the annular volume (80) through the lower valve (82). By changing the water/air ratio in the annular volume (80), the buoyancy and mass of the actuator (10) are changed and so the natural oscillation period of the actuator (10) is changed. By selecting a sufficiently powerful pump (83) and valves (81, 82) of sufficient capacity, the oscillation period can be changed dynamically.

FIG. 9. Side Cross-Section of WEC Showing Connection to Submerged Floating Platform The actuator (10) is connected by an upper line (17) to a tuning float (15) and by a mooring line (12) to a submerged floating platform (90). The upper line (17) is sufficiently elastic to allow the actuator (10) and the tuning float (15) to move at different amplitudes. An upper locking winch (18) inside the tuning float (15) controls the length and tension of the upper line (17). The mooring line (12) is sufficiently elastic to allow the actuator (10) to follow the orbital motion of energetic swell. A locking winch (91) fixed to the submerged platform (90) controls the length and tension of the mooring line (12). Four axi-symmetric tethers (19) (two are shown) connect the actuator (10) to pulleys (92) fixed to the platform (90). The tethers (19) loop over the pulleys (92), pass through channels in the platform (90) and terminate in counterweights (111). The submerged platform (90) is held in quiet water by a combination of positive buoyancy and taut, spread mooring lines (93). The mooring lines (93) can use the hybrid construction described in FIG. 4. The platform (90) does not need to be moved to tune either to wave height or to swell period. The actuator (10) is positively buoyant and tuning to wave height is by controlling the length of the mooring line (12) and the upper line (17). Tuning to swell period is by controlling the tension on the upper line (17) and the mooring line (12) and by controlling the mass of the actuator (10), using the methods described in FIGS. 5,7 and 8. The entire actuator vessel can be an inertial trap as described in FIGS. 5 and 10.

FIG. 10a. Side Cross-Section of Variable Capacity Inertial Trap Using Bowing Struts: Low Contained Volume A variable capacity inertial trap (100) comprises an axi-symmetric sheaf (101) of identical flexible struts (102: only two struts are shown), hinged at the ends to a rigid upper ring (103) and to a rigid lower ring (104). Adjacent struts (102) are linked by pleated elastic material (not shown). A rigid vertical rod (105) extends along the vertical axis of the sheaf (101) and is fixed to the lower ring (104). The lower ring (104) is arranged as an open port allowing water to flow in and out of the interior of the sheaf (101). The rod (105) has a rack (106) fixed to it and arranged to grip the rod (105) and slide on the rod (105) and move on the rack (106) is a rigid block (107) that is fixed to the upper ring (103). The block (107) contains a geared electric motor driving a toothed wheel that engages the rack (106) (This detail is not shown). The block (107) is at the upper end of the rod (105) so that the struts (102) are unbowed and the sheaf (101) has a cylindrical shape. The sheaf (101) is submerged and the water trapped inside the sheaf (101) is at a minimum (108, shown hatched).

FIG. 10b. Side Cross-Section of Variable Capacity Inertial Trap Using Bowing Struts: High Contained Volume Compared with FIG. 10a, the block (107) has moved along the rack (106) down the rod (105) pulling the ends of the struts (102) together so that the struts (102) bow out and the elastic pleats (not shown) unfold and stretch. The sheaf (101) has a spheroidal shape and the water trapped inside the sheaf (101) is at a maximum (108, shown hatched).

FIG. 10c. Plan of Variable Capacity Inertial Trap Using Bowing Struts: High Contained Volume This is the spheroidal bowed sheaf (101) seen in plan view from below. Adjacent struts (102: 8 struts are shown; the number of struts could be higher) are linked by elastic pleats (106). The lower ring (104) is fixed to the rod (105) by rigid spokes (108: four spokes are shown) with gaps between, allowing water to flow round the spokes (108).

By moving the block (107), the mass of the trap (100) can be varied rapidly, avoiding the high energy consumption associated with the known alternative mass variation method method of blowing water out of a submerged vessel. (See FIG. 8).

The trap (100) can be attached rigidly to an actuator (10: not shown) using the rod (105). In the WEC example shown in FIG. 9, the trap (100) can itself be the actuator (10).

Figure 11:
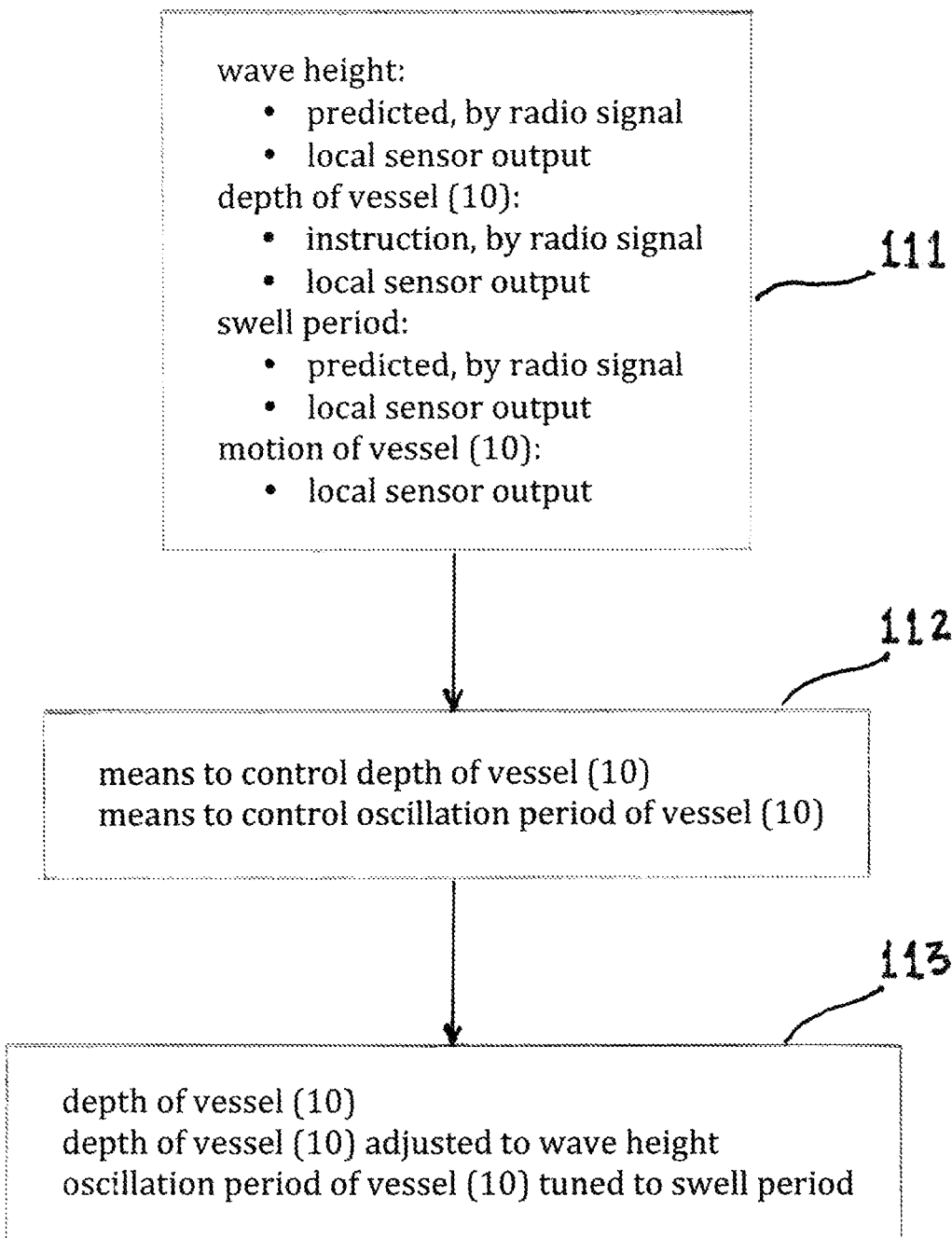
FIG. 11. Control system showing input of data from radio signals and local sensors applied to means for controlling depth of submersion of the submerged vessel (10) allowing adjustment to wave height, and applied to means for controlling the natural oscillation period of the submerged vessel (10) allowing adjustment to swell period.

FIG. 11. Control system. Data inputs (111) comprise wave height: prediction by radio signal, measurement from local sensor; depth of submersion of vessel (10): instruction by radio signal, measurement from local sensor; swell period: prediction by radio signal, measurement from local sensor; motion of vessel (10) from local sensor. This data is applied to the means for control of the submerged vessel (10) (112): means to control the depth of the vessel (10); means to control the oscillation period of the vessel (10). Outputs from the means to control (113) are variation in the depth of the vessel (10), the depth of the vessel (10) adjusted to wave height, the oscillation period of the vessel (10) tuned to the swell oscillation period.

CITATION LIST

Patents

GB 1218866.0: also as US 20140117671 A1 May 2014 Gregory
U.S. Pat. No. 8,480,381 B2 Jul. 2013 Burns (Ceto)
US 2012/0102938 A1 May 2002 Burns
WO 2008065684 A1 June 2008 Grassi
WO 2010007418 A3 Dec. 2010 Foster et al (Marine Power Systems)
GB 2461792 A January 2010 Foster et al (Marine Power Systems)
US 2013/0160444 A1 Jun. 2013 Foster et al (Marine Power Systems)
US 2011/0146263 A9 Jun. 2011 Moore (Protean Power)
U.S. Pat. No. 4,208,877 A June 1980 Evans et al
U.S. Pat. No. 6,229,225 B1 May 2001 Carroll (Ocean PowerTechnologies)
U.S. Pat. No. 6,756,695 B2 Jun. 2004 Hibbs et al
U.S. Pat. No. 7,632,041 B2 Dec. 2009 Jean et al (Single Buoy Moorings)
US 2009/0056327 A1 Mar. 2009 Raikamo et al
US 20110012358 A1 January 2011 Brewster et al
U.S. Pat. No. 4,453,894 A June 1984 Ferone et al
U.S. Pat. No. 6,647,716 B2 Nov. 2003 Boyd
U.S. Pat. No. 7,245,041 B1 Jul. 2007 Olson
U.S. Pat. No. 7,319,278 B2 Jan. 2008 Gehring
U.S. Pat. No. 8,093,736 B2 Jan. 2012 Raftery (Stevens Institute)
US 2011/0155039 A1 June 2011 Moore
U.S. Pat. No. 3,766,307 A October 1973 Andrews
Also, subsequent to this filing:
U.S. Pat. No. 2,791,979 A May 1957 Willis
WO 02/059480 A 1 Aug. 2002 Hadano (Yamaguchi Tech.)
WO 2015/003229 A1 Jan. 2015 Nauwelaerts (Laminaria)
WO 2009/012575 A1 Jan. 2009 Wigglesworth

OTHER REFERENCES www.carnegiewave.com
www.40southenergy.com
www.marinepowersystems.co.uk

The invention claimed is:
1. A wave energy converter comprising:
a. a positively buoyant axi-symmetric vessel fully submerged in an ocean;
b. said vessel being moored to a reaction mass by a vertical mooring line;
c. said reaction mass being selected from the group consisting of: a seabed; a submerged floating platform, whereby said vessel can react directly with said seabed at depths of said ocean that characterize a continental shelf and can react with said platform at depths of said ocean greater than depths that characterize said continental shelf;
d. said vessel being tethered axi-symmetrically to said reaction mass by at least three non-vertical tethers;
e. said tethers being held under tension by tensioning means and connected to a power take off system whereby orbital and omnidirectional motion of said vessel driven by orbital and omnidirectional motion of swell can be converted to useful power;
f. a control system comprising radio input of predicted wave height and swell period, radio input of a required depth of submersion of said vessel, input from local sensors measuring wave height and swell oscillation period and input from local sensors measuring motion and depth of submersion of said vessel, said inputs being applied to means for control of said depth of submersion of said vessel and to means for control of said vessel's natural period of oscillation, outputs of said means for control being said depth of submersion this being varable according to said wave height and said natural period of oscillation, this being variable according to said swell oscillation period;
g. said mooring line having at least one elastically extensible section enabling said vessel to follow an orbital path, responding to both heave and surge vectors of said swell from any direction;
h. said mooring line being connected to a lower locking winch, whereby said depth of submersion of said vessel can be varied dynamically between a near-surface position and a position in quiet water in response to varying wave heights so that high energy conversion rates can be sustained in differing wave climates and so that storm damage can be avoided;
i. said vessel being connected by a non-slidable connection to an upper line that is attached to a surface-piercing float of positive buoyancy;
j. said upper line having at least one elastically extensible section enabling said vessel to follow an orbital path responding to both heave and surge vectors of said swell from any direction;
k. said upper line being connected to an upper locking winch, whereby said depth of-submersion of said vessel can be varied and tension of said upper line and of said mooring line can be varied so that said vessel's natural period of oscillation can be dynamically varied to match said swell oscillation period over a range that characterizes energetic ocean swell;
l. said tethers having means for said tethers to be neutrally buoyant uniformly along the length of said tethers, whereby gravitational flexing can be made insignificant over depths that characterize the continental shelf and so power losses from gravitational flexing can be made insignificant.

2. A wave energy converter as claimed in claim 1 wherein said vessel has a total mass and has means for dynamically changing said total mass, whereby said natural period of oscillation of said vessel can be dynamically varied, said means comprising:
a. at least one hollow annular body full of water and surrounding said mooring line;
b. said annular body having negative buoyancy;
c. said annular body being connected to a mass cable;
d. said mass cable being connected to a locking mass winch inside said vessel, whereby said annular body can be pulled tightly to said vessel so that said total mass of said vessel is can be rapidly increased and said annular body can be released so that the total mass of said vessel is can be rapidly reduced.

3. A wave energy converter as claimed in claim 1 wherein said vessel has means for dynamically changing said total mass of said vessel, whereby said natural period of oscillation of said vessel can be dynamically varied, said means comprising:
a. said vessel being attached to a chamber full of water and said chamber being submerged in said ocean;

b. said chamber being connected by at least one open port to said ocean;

c. said chamber having a geometry that can be varied, whereby water contained in said chamber can be varied in volume;

d. at least one linear actuator being attached to said vessel and said linear actuator being arranged to vary said geometry.

4. A wave energy converter as claimed in claim 1 wherein said vessel has means for dynamically changing said total mass and buoyancy of said vessel, whereby said natural period of oscillation of said vessel can be dynamically varied, said means comprising:

a. within said vessel a pumpable chamber;

b. connected to said pumpable chamber an air pump;

c. a flexible hose connecting said pump to a floating snorkel;

d. valves that allow water to be admitted to said pumpable chamber or blown out of said pumpable chamber, whereby relative volumes of air and water in said vessel can be varied.

5. A wave energy converter as claimed in claim 1 wherein said vessel is has a radius of oscillation and said radius of oscillation can be dynamically varied whereby said natural period of oscillation of said vessel can be dynamically varied, by means comprising:

a. a rigid collar slidably attached to said mooring line;

b. fixed to said collar at least three flexible axi-symmetric cables;

c. said cables passing round pulleys attached to anchors;

d. said cables terminating in submerged floats, whereby said cables are kept under tension;

e. said collar being attached to a locking collar winch inside said vessel, whereby said collar can be raised or lowered so that said radius of oscillation of said vessel can be varied;

f. said cables running through remotely controlled locking devices whereby said cables can be locked in position.

6. A wave energy converter as claimed in claim 1 wherein said tensioning means is counterweights attached to ends of flexible sections of said tethers that run over pulleys.

7. A wave energy converter as claimed in claim 1 wherein said means for said tethers to be neutrally buoyant uniformly along the length of said tethers is by a hybrid construction of tether comprising:

a. a lower rigid section selected from the group consisting of: sealed hollow steel; sealed hollow steel filled with closed cell rigid plastic foam, whereby said lower section has an average density is-substantially equal to a density that characterizes surrounding seawater;

b. an upper flexible section comprising a mixture of high modulus flexible polymer fibers, whereby said upper section has an average density substantially equal to a density that characterizes surrounding seawater;

c. said lower section being connected to an anchor by a swiveling linkage and said lower section being connected to said upper section by a swiveling linkage, whereby twisting stress is avoided.

8. A method of operating a wave energy converter by:

a. submerging a buoyant vessel in an ocean;

b. mooring said submerged vessel with a vertical mooring line of controllable length and at least one elastically extensible section, allowing said submerged vessel to follow said orbital and omnidirectional motion of said swell;

c. connecting said submerged vessel by a non-slidable connection to a surface float with an upper line of controllable length and at least one elastically extensible section, allowing said submerged vessel to follow said orbital and omnidirectional motion;

d. dynamically varying said depth of submersion of said submerged vessel by varying said controllable length of said mooring line, whereby said depth of submersion can be adjusted according to wave height;

e. dynamically varying said natural period of oscillation of said submerged vessel by dynamically varying said tension on said upper line whereby said natural period of oscillation of said vessel can be tuned to match said swell oscillation period;

f. extracting power from said orbital and omnidirectional motion of said swell by means of at least three axi-symmetric tethers directly connecting said submerged vessel to a reaction mass;

g. using tethers that are neutrally buoyant uniformly along the length of said tethers so that gravitational flexing is not significant over the depths that characterize said continental shelf.

\* \* \* \* \*